(12) United States Patent
Westwood et al.

(10) Patent No.: US 7,615,589 B2
(45) Date of Patent: Nov. 10, 2009

(54) PROPERTIES OF PEROXIDE-CURED ELASTOMER COMPOSITIONS

(75) Inventors: Alistair D. Westwood, Kingwood, TX (US); Yann Devorest, Waterloo (BE); Eric P. Jourdain, Rhode Saint Genèse (BE); Olivier Georjon, Sainte Adresse (FR); Bryan R. Chapman, Annandale, NJ (US); Michael C. Bulawa, Houston, TX (US); Bruce R. Lundmark, Waller, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 6 days.

(21) Appl. No.: 11/701,996

(22) Filed: Feb. 2, 2007

(65) Prior Publication Data

US 2008/0188600 A1 Aug. 7, 2008

(51) Int. Cl.
- C08K 5/01 (2006.01)
- C08L 53/00 (2006.01)
- C08J 3/22 (2006.01)
- C08L 91/08 (2006.01)
- A61K 9/16 (2006.01)

(52) U.S. Cl. ......................... 524/474; 524/487; 524/543
(58) Field of Classification Search ................. 524/487, 524/474, 543
See application file for complete search history.

(56) References Cited

U.S. PATENT DOCUMENTS

| | | | |
|---|---|---|---|
| 2,817,693 A | 12/1957 | Koome et al. |
| 4,536,537 A | 8/1985 | Klingensmith et al. |
| 4,594,172 A | 6/1986 | Sie |
| 4,645,791 A | 2/1987 | Theodore et al. |
| 4,693,838 A | 9/1987 | Varma et al. |
| 4,833,195 A | 5/1989 | Adur et al. |
| 4,853,428 A | 8/1989 | Theodore et al. |
| 4,897,178 A | 1/1990 | Best et al. |
| 4,921,594 A | 5/1990 | Miller |
| 4,943,672 A | 7/1990 | Hamner et al. |
| 4,975,177 A | 12/1990 | Garwood et al. |
| 4,996,094 A | 2/1991 | Dutt |
| 5,075,269 A | 12/1991 | Degnan et al. |
| 5,079,287 A | 1/1992 | Takeshi et al. |
| 5,080,942 A | 1/1992 | Yau |
| 5,240,996 A | 8/1993 | D'Amelia et al. |
| 5,512,625 A | 4/1996 | Butterbach et al. |
| 5,906,727 A | 5/1999 | Wittenbrink et al. |
| 6,013,727 A | 1/2000 | Dharmarajan et al. |
| 6,080,301 A | 6/2000 | Berlowitz et al. |
| 6,084,031 A | 7/2000 | Medsker et al. |
| 6,086,996 A | 7/2000 | Rancich et al. |
| 6,090,989 A | 7/2000 | Trewella et al. |
| 6,147,180 A | 11/2000 | Markel et al. |
| 6,165,949 A | 12/2000 | Berlowitz et al. |
| 6,337,364 B1 | 1/2002 | Sakaki et al. |
| 6,383,634 B1 | 5/2002 | Kornfeldt et al. |
| 6,451,915 B1 | 9/2002 | Ellul et al. |
| 6,515,231 B1 | 2/2003 | Strobech et al. |
| 6,639,020 B1 | 10/2003 | Brant |
| 6,730,739 B2 | 5/2004 | Gipson |
| 6,750,292 B2 | 6/2004 | Dozeman et al. |
| 7,319,077 B2 | 1/2008 | Mehta et al. |
| 7,413,784 B2 | 8/2008 | Ouhadi |
| 7,470,740 B2 | 12/2008 | Givord et al. |
| 7,476,710 B2 | 1/2009 | Mehta et al. |
| 7,531,594 B2 | 5/2009 | Lin et al. |
| 2002/0188057 A1 | 12/2002 | Chen |
| 2003/0144415 A1 | 7/2003 | Wang et al. |
| 2003/0181575 A1 | 9/2003 | Schmidt et al. |
| 2004/0054040 A1 | 3/2004 | Lin et al. |
| 2004/0091631 A1 | 5/2004 | Belli et al. |
| 2004/0106723 A1 | 6/2004 | Yang et al. |
| 2004/0260001 A1 | 12/2004 | Lin et al. |
| 2005/0043484 A1 | 2/2005 | Wang et al. |
| 2005/0148720 A1 | 7/2005 | Li et al. |
| 2005/0215717 A1 | 9/2005 | Dozeman |
| 2005/0222861 A1 | 10/2005 | Silverman et al. |
| 2005/0250894 A1 | 11/2005 | Null |
| 2005/0277738 A1* | 12/2005 | Hoyweghen et al. ........ 525/191 |
| 2006/0008643 A1 | 1/2006 | Lin et al. |
| 2006/0079617 A1 | 4/2006 | Kappes et al. |
| 2006/0173123 A1 | 8/2006 | Yang et al. |
| 2006/0178483 A1 | 8/2006 | Mehta et al. |
| 2006/0189744 A1* | 8/2006 | Tse et al. ................... 524/447 |
| 2006/0189763 A1 | 8/2006 | Yang et al. |
| 2006/0205863 A1 | 9/2006 | Lin et al. |
| 2006/0247332 A1 | 11/2006 | Coffey et al. |
| 2007/0021560 A1 | 1/2007 | Tse et al. |
| 2007/0021561 A1 | 1/2007 | Tse et al. |
| 2007/0021566 A1 | 1/2007 | Tse et al. |
| 2007/0100053 A1 | 5/2007 | Chapman et al. |
| 2007/0167553 A1 | 7/2007 | Westwood et al. |
| 2008/0045638 A1 | 2/2008 | Chapman et al. |

(Continued)

FOREIGN PATENT DOCUMENTS

EP 0 300 689 1/1989

(Continued)

OTHER PUBLICATIONS

Noordermeer, Jacobus W.M., Ethylene-Propylene Elastomers, Encyclopedia of Polymer Science and Technology, John Wiley & Sons, Inc., (Oct. 15, 2002).*

(Continued)

*Primary Examiner*—Mark Eashoo
*Assistant Examiner*—Angela C Scott

(57) ABSTRACT

An elastomeric composition and method for making the same are provided. The composition can include a rubber component comprising one or more ethylene-propylene elastomers, one or more peroxide curing agents and one or more non-functionalized plasticizers having a viscosity index of 120 or more.

74 Claims, No Drawings

U.S. PATENT DOCUMENTS

| | | | |
|---|---|---|---|
| 2008/0177123 | A1 | 7/2008 | Blais et al. |
| 2008/0221274 | A1 | 9/2008 | Jourdain |
| 2008/0227919 | A9 | 9/2008 | Li et al. |
| 2008/0234157 | A1 | 9/2008 | Yoon et al. |
| 2008/0268272 | A1 | 10/2008 | Jourdain |
| 2009/0003781 | A1 | 1/2009 | Parris et al. |
| 2009/0043049 | A1 | 2/2009 | Chapman et al. |
| 2009/0062429 | A9 | 3/2009 | Coffey et al. |
| 2009/0171001 | A1 | 7/2009 | Lin et al. |

FOREIGN PATENT DOCUMENTS

| | | |
|---|---|---|
| EP | 315 363 B1 | 1/1994 |
| EP | 654 070 B1 | 5/1995 |
| EP | 0 464 546 | 7/1995 |
| EP | 0 464 547 | 5/1998 |
| EP | 990 675 A1 | 4/2000 |
| EP | 1 028 145 B1 | 8/2000 |
| EP | 1357150 | 10/2003 |
| EP | 1 342 249 | 1/2009 |
| GB | 1350257 | 4/1974 |
| GB | 1390359 | 4/1975 |
| GB | 1429494 | 3/1976 |
| GB | 1440230 | 6/1976 |
| JP | 56-095938 | 8/1981 |
| JP | 04-063851 | 2/1992 |
| JP | 06-316659 | 11/1994 |
| JP | 07-292167 | 11/1995 |
| JP | 09-208761 | 8/1997 |
| WO | WO 98/44041 | 10/1998 |
| WO | 99/24506 | 5/1999 |
| WO | WO 01/18109 | 3/2001 |
| WO | WO 02/18487 | 3/2002 |
| WO | WO 02/30194 | 4/2002 |
| WO | WO 02/31044 | 4/2002 |
| WO | WO 03/048252 | 6/2003 |
| WO | WO 2004/009699 | 1/2004 |
| WO | WO 2005/010094 | 2/2005 |
| WO | WO 2006/006346 | 1/2006 |
| WO | 2006/128646 | 12/2006 |
| WO | WO 2007/048422 | 5/2007 |
| WO | WO 2007/145713 | 12/2007 |

OTHER PUBLICATIONS

Way Back Machine, Webpage: http://web.archive.org/web/20050302084522/http://techcenter.lanxess.com/trp/emea/en/products/description/8/index.jsp?pid=8, Mar. 2, 2005.*

Way Back Machine Date Page.*

Way Back Machine Information Page.*

Jens Stehr, Investigation of the Effects of Poly($\alpha$-olefin) Plasticizers on the Properties of Elastomers, KGK, Jan./Feb. 2007, pp. 14-19 (translated from German by McElroy Translation Company.

U.S. Appl. No. 12/012,380, filed Feb. 1, 2008, Baugh et al.

U.S. Appl. No. 12/108,312, filed Apr. 23, 2008, Patil et al.

U.S. Appl. No. 12/402,211, filed Mar. 11, 2009, Tracey et al.

U.S. Appl. No. 12/492,747, filed Jun. 26, 2009, Rodgers et al.

U.S. Appl. No. 61/203,523, filed Dec. 23, 2008, Wu et al.

U.S. Appl. No. 61/203,524, filed Dec. 23, 2008, Fairchild et al.

Rudnick and Shubkin in *Synthetic Lubricants and High-performance functional Fluids*, $2^{nd}$ Ed. (Marcel Dekker, Inc., New York, 1999), pp. 393-411.

G. ver Strate, Encyclopedia of Polymer Science and Engineering, vol. 6, $2^{nd}$ Ed., 1986, pp. 522-564.

CRC handbook of Chemistry and Physics (David R. Lide, $82^{nd}$ Ed. CRC Press 2001), pp. E-60.

Kanauzova et al., Effect of Technological Additives on Properties of Thermoplastic Vulcanizates Based on Ethylene Propylene Rubber and Polyolefins, Kauchuk I Rezina, 2000, vol. 4, pp. 12-15 (Abstract).

* cited by examiner

PROPERTIES OF PEROXIDE-CURED ELASTOMER COMPOSITIONS

BACKGROUND OF THE INVENTION

1. Field of the Invention

Embodiments of the present invention generally relate to peroxide cured elastomer systems.

2. Description of the Related Art

Crosslinked elastomer formulations based on ethylene-propylene (EP) and/or ethylene-propylene-diene (EPDM) elastomers are useful in a variety of applications that are exposed to high (>150° C.) and/or low (<−20° C.) temperatures during the product life time. Such applications include automotive parts like under-hood belts and hoses. To improve flexibility and/or workability of such crosslinked polyolefin elastomer formulations, a substantial amount of process oil, which acts as both a processing aid and a plasticizer, is added. To maintain the mechanical integrity (and therefore performance) of the manufactured part, it is desirable to minimize the gradual loss of the process oil over time.

Permanence is especially challenging when the part is exposed to high temperatures over long times and can be a problem when a low molecular weight oil is used. On the other hand, the parts should also stay flexible to very low temperatures. This presents a need for an oil with a low pour point, which improves as molecular weight is lowered. Thus, the choice of process oil is a balance between permanence (favoring high molecular weight) and low-temperature performance (favoring low molecular weight) and defines a practical temperature window of utility for the formulation (i.e., from the onset of brittleness on the low end to the onset of unacceptable oil loss at the high end).

When under-hood temperature requirements are high, a peroxide cure system is increasingly used for EP and EPDM compounds because traditional sulfur-cured compounds have an upper use temperature of about 130-150° C. This presents another problem for mineral oils, since most contain chemical moieties (cyclic or aromatic structures, unsaturation, and heteroatoms) that can interfere with peroxide cure systems and can compromise the cure rate and final cure state (degree of crosslinking). This also presents a challenge for conventional mineral oils in terms of the permanence/pour-point balance.

WO 02/31044 describes mono-olefinic polyalphaolefin (PAO) oils having molecular weights between 400 and 1,000 g/mol, as plasticizers for vulcanized or unvulcanized olefin elastomers such as EP, EPDM, natural, butyl, and polybutadiene rubbers. U.S. Pat. No. 4,645,791 describes vulcanized elastomer compositions of sulfur cured EP and EPDM rubbers; a reinforcing particulate filler; and a synthetic hydrocarbon basestock lubricating oil with a molecular weight of between 250 and 1,500 g/mol. EP 0315363 describes vulcanized elastomer compositions of sulfur cured EP and EPDM rubbers; a reinforcing particulate filler; a PAO oil or blend of PAO oils with a kinematic viscosity at 100° C. of 2 to 200 cSt; and a naphthenic and/or paraffinic mineral oil. U.S. Pat. No. 4,833,195 describes pelletizable polyolefin compositions of an EP, EPDM, polybutadiene, polyisoprene, and polyisobutylene rubbers; and a PAO oligomer of $C_2$ to $C_6$ olefins having a molecular weight of less than 15,000 g/mol; and optionally a thermoplastic polyolefin such as polyethylene or polypropylene. EP 1028145 describes vulcanized ethylene/propylene/ethylidene-norbornene compositions comprising 300 to 700 phr of a softener that has a low pour point (−40° C. or less) and a solubility parameter of 6 to 8 (units are unstated), such as low molecular weight EP copolymers, mineral oils, or liquid polybutene or polyisoprene. WO 02/18487 and WO 03/048252 describe thermoplastic elastomer compositions with phenolic resin cured EP, EPDM, ethylene/alpha-olefin, butyl, and butadiene rubbers; 10 to 90 wt % of a thermoplastic polyolefin; and a PAO oil with a molecular weight of 1,000 g/mol or less. Mineral oils are added to the composition if at least 25 wt % of the total oil is PAO. WO 04/09699 describes compositions of EPDM rubber and a Fischer-Tropsch derived paraffinic process oil with a kinematic viscosity at 100° C. of between 8 and 30 cSt. Additional references include U.S. Pat. No. 6,451,915; U.S. 2005/222861, and JP 07292167.

Based on the above, there is a need for an oil of highly paraffinic structure that minimizes interference with peroxide cure systems, is thermally stable, is of sufficient molecular weight to increase retention of the oil at high temperatures, and has a low pour point to ensure flexibility at low temperatures.

SUMMARY OF THE INVENTION

An elastomeric composition and method for making the same are provided. In at least one specific embodiment, the composition includes a rubber component comprising one or more ethylene-propylene elastomers, one or more peroxide curing agents and one or more non-functionalized plasticizers having a viscosity index of 120 or more, a kinematic viscosity @100° C. of 20 cSt or more, and an Mn of 1100 g/mole or more.

In yet another specific embodiment, the composition includes a rubber component comprising one or more ethylene-propylene elastomers, one or more peroxide curing agents and one or more non-functionalized plasticizers having a viscosity index of 120 or more, wherein the one or more non-functionalized plasticizers are selected from the group consisting of Group III mineral oils and wax isomerate lubricant base stocks or oils.

In yet another specific embodiment, the composition includes at least one rubber component comprising ethylene-propylene rubber, at least one rubber component comprising ethylene-propylene-diene (EPDM) rubber and two or more non-functionalized plasticizers where at least a first non-functionalized plasticizer has a kinematic viscosity @100° C. of 300 cSt or more and at least a second non-functionalized plasticizer has a kinematic viscosity @100° C. of 150 cSt or less.

In yet another specific embodiment, the composition includes a rubber component comprising one or more ethylene-propylene elastomers, one or more peroxide curing agents and one or more non-functionalized plasticizers having a viscosity index of 120 or more, wherein polypropylene and polyethylene are both substantially absent from the composition.

In at least one specific embodiment, the method for preparing an elastomer composition comprises mixing at least one a rubber component comprising a blend of ethylene-propylene (EP) rubber and ethylene-propylene-diene (EPDM) rubber, peroxide and one or more non-functionalized plasticizers having a viscosity index of 120 or more, a pour point of −18° C. or less and kinematic viscosity @100° C. of 40 cSt or more, and an Mn of 700 or more.

DETAILED DESCRIPTION OF THE INVENTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Elastomer compositions with unexpectedly high flexibility after prolonged heat-aging above 100° C. and/or upon cooling below 0° C., and surprisingly high oil retention, are provided. In one or more embodiments, the elastomer composition includes a rubber component comprising one or more at least partially cured ethylene-propylene elastomer and one or more non-functionalized plasticizer ("NFP"). In one or more embodiments, the one or more ethylene-propylene elastomer is at least partially peroxide-cured.

Not wishing to be bound by theory, mineral oils traditionally used as elastomer process oils typically contain a significant fraction of aromatic and/or naphthenic moieties. Even so-called "paraffinic" mineral oils have compositions such that large fraction of carbons are in naphthenic moieties, and can contain a few percent of carbon-carbon unsaturation (olefinic and aromatic moieties) and/or heteroatoms like sulfur and nitrogen, which can interact with a peroxide cure system resulting in undesirable side reactions. The same is not true for one or more NFPs described herein. It is believed that such difference in structure gives NFPs superior thermal and oxidative stability.

NFPs are also available in a broader range of viscosities (molecular weights) than mineral oils. In particular, the maximum viscosity of commercially available mineral oil is about 35 cSt (kinematic viscosity at 100° C.), while NFPs are available up to 1000 cSt or more. It is believed that the higher molecular weights combined with higher thermal and oxidative stability allow NFPs to retain their plasticizing effect in elastomer compounds exposed to high temperatures for long times.

The term "mineral oil" refers to any hydrocarbon liquid of lubricating viscosity (i.e., a kinematic viscosity at 100° C. of 1 cSt or more) derived from petroleum crude oil and subjected to one or more refining and/or hydroprocessing steps (such as fractionation, hydrocracking, dewaxing, isomerization, and hydrofinishing) to purify and chemically modify the components to achieve a final set of properties. Such "refined" oils are in contrast to "synthetic" oils, which are manufactured by combining monomer units into larger molecules using catalysts, initiators, and/or heat. In the lubricant industry, refined "basestocks" (which are mineral oils) are commonly divided into three categories based on their properties, as follows:

| Category | Saturates | | Sulfur | | Viscosity Index |
|---|---|---|---|---|---|
| Group I | <90 wt % | and/or | >0.03 wt % | and | 80-119 |
| Group II | ≧90 wt % | and | ≦0.03 wt % | and | 80-119 |
| Group III | ≧90 wt % | and | ≦0.03 wt % | and | ≧120 |

However, even if a mineral oil is not explicitly identified as a Group I, II, or III basestock, it is still possible to categorize it using this scheme. Accordingly, herein, a "Group III Mineral Oil" is defined to be any mineral oil having a viscosity index of 120 or more, whereas a "Group III basestock" is defined according to the more limiting specifications given above; therefore, any Group III basestock will also be a Group III Mineral Oil, but the opposite is not necessarily true.

In the polymer industry, mineral oils are often called "process oils" (or "extender oils"). A common classification system for process oils is to identify them as either "paraffinic", "naphthenic", or "aromatic" mineral or process oils based on the relative content of paraffinic, naphthenic, and aromatic moieties (see Typical heading in the table below). Herein, the three common classes are defined based on the compositions described under Definitions heading in the table below:

| Mineral Oil Type | Typical | | | Definitions | | |
|---|---|---|---|---|---|---|
| | $C_P$ | $C_N$ | $C_A$ | $C_P$ | $C_N$ | $C_A$ |
| Paraffinic | 60-80% | 20-40% | 0-10% | ≧60% | <40% | <20% |
| Naphthenic | 40-55% | 40-55% | 6-15% | | ≧40% | <20% |
| Aromatic | 35-55% | 10-35% | 30-40% | | | ≧20% | where $C_P$, $C_N$, and $C_A$ indicate the percentage of carbons in paraffinic chain-like (i.e., isoparaffinic and normal paraffinic) structures, naphthenic (i.e., saturated ring) structures, and aromatic (i.e., unsaturated ring) structures, respectively.

Illustrative paraffinic process oils are listed in the table below; each has a viscosity index less than 120, so none are Group III Mineral Oils. All have less than 80% carbons in paraffinic chain-like structures ($C_P$<80%), meaning they have more than 20% carbons in aromatic and/or naphthenic ring-like structures ($C_A$+$C_N$). Paraffinic process oils have relatively low viscosity and/or relatively high pour points.

Illustrative Paraffinic Process Oils

| | KV 40° C., cSt | KV 100° C., cSt | VI | Pour Point, ° C. | Specific gravity | Flash Point ° C. | Cp, % |
|---|---|---|---|---|---|---|---|
| Drakeol 34[1] | 76 | 9 | 99 | −12 | 0.872 | 254 | 68 |
| Paralux 2401R[2] | 43 | 6 | 101 | −12 | 0.866 | 234 | 66 |
| Paralux 6001R[2] | 118 | 12 | 102 | −21 | 0.875 | 274 | 70 |
| Sunpar 120[3] | 41 | 6 | 106 | −15 | 0.872 | 228 | 68 |
| Sunpar 150[3] | 94 | 11 | 97 | −12 | 0.881 | 245 | 65 |
| Sunpar 2280[3] | 475 | 31 | 95 | −9 | 0.899 | 305 | 67 |
| Plastol 135[4] | 24 | 5 | 104 | −9 | 0.865 | 210 | 67 |
| Plastol 537[4] | 103 | 11 | 97 | −3 | 0.880 | 240 | 66 |
| Plastol 2105[4] | 380 | 30 | 110 | −15 | 0.885 | 270 | |
| Flexon 843[4] | 30 | 5 | 91 | −12 | 0.869 | 218 | 65 |

-continued

| Illustrative Paraffinic Process Oils | | | | | | |
|---|---|---|---|---|---|---|
| | KV 40° C., cSt | KV 100° C., cSt | VI | Pour Point, °C. | Specific gravity | Flash Point °C. | Cp, % |
| Flexon 865[4] | 106 | 11 | 93 | −3 | 0.879 | 252 | 69 |
| Flexon 815[4] | 457 | 32 | 101 | −9 | 0.895 | 310 | 67 |
| Shellflex 210[5] | 19 | 4 | 95 | −18 | 0.860 | 216 | 66 |
| Shellflex 330[5] | 70 | 9 | 95 | −10 | 0.875 | 256 | 68 |
| Shellflex 810[5] | 501 | 33 | 95 | −9 | 0.896 | 324 | 69 |
| Diana PW32[6] | 31 | 5 | 104 | −18 | 0.862 | 226 | 67 |
| Diana PW90[6] | 90 | 11 | 105 | −22 | 0.872 | 262 | 71 |
| Diana PW380[6] | 376 | 26 | 106 | −19 | 0.877 | 293 | 73 |

[1]Available from Penreco (USA).
[2]Available from Chevron (USA).
[3]Available from Sunoco (USA).
[4]Available from ExxonMobil (USA).
[5]Available from Royal Dutch Shell (UK/Netherlands).
[6]Available from Idemitsu (Japan).

Rubber Component

The "rubber component" can include one or more ethylene-propylene elastomers. The "ethylene-propylene elastomer" can be any cross-linkable polyolefin copolymer containing ethylene, propylene, and optionally one or more diene. Illustrative ethylene-propylene elastomers include but are not limited to ethylene-propylene bipolymer (EP) and ethylene-propylene-diene terpolymer (EPDM) elastomers. The term "copolymer" can include any polymer having two or more different monomers in the same chain, and encompasses random copolymers, statistical copolymers, interpolymers, and block copolymers.

A suitable EP elastomer can have an ethylene content of 40 to 80 wt % (preferably 45 to 75 wt %, preferably 50 to 70 wt %). A suitable EP elastomer can also have an ethylene content of 5 to 25 wt % (preferably 10 to 20 wt %).

A suitable EPDM elastomer can have an ethylene content of 40 to 80 wt % (preferably 45 to 75 wt %, preferably 50 to 70 wt %) and a diene content of less than 15 wt % (preferably 0.5 to 15 wt %, preferably 1 to 12 wt %, preferably 2 to 10 wt %, preferably 3 to 9 wt %). In one or more embodiments, a suitable EPDM elastomer can have an ethylene content of 5 to 25 wt % (preferably 10 to 20 wt %). In other embodiments, a suitable EPDM elastomer can have a diene content of 0.1 to 3 wt % (preferably 0.3 to 2 wt %), or 0.3 to 10 wt % (preferably 1 to 5 wt %). Suitable dienes can have at least two unsaturated bonds, at least one of which can be incorporated into a polymer, and can be straight chained, branched, cyclic, bridged ring, bicyclic, etc.; preferably the unsaturated bonds are non-conjugated. Preferred dienes include 5-ethylidene-2-norbornene (ENB), 5-vinyl-2-norbornene (VNB), divinyl benzene (DVB), dicyclopentadiene (DCPD), and 1,4-hexadiene.

Preferred ethylene-propylene elastomers can have one or more of the following properties: a density of 0.885 g/cm³ or less (preferably 0.88 g/cm³, preferably 0.87 g/cm³ or less, preferably 0.865 g/cm³ or less, preferably 0.86 g/cm³ or less, preferably 0.855 g/cm³ or less); and/or a heat of fusion ($H_f$) of less than 70 J/g (preferably less than 60 J/g, preferably less than 50 J/g, preferably less than 40 J/g, preferably less than 30 J/g, preferably less than 20 J/g, preferably less than 10 J/g, preferably less than 5 J/g, preferably indiscernible); and/or an ethylene or propylene crystallinity of less than 15 wt % (preferably less than 10 wt %, preferably less than 5 wt %, preferably less than 2 wt %, preferably undetectable); and/or a melting point ($T_m$) of 120° C. or less (preferably 100° C. or less, preferably 80° C. or less, preferably 70° C. or less, preferably 60° C. or less, preferably 50° C. or less, preferably 40° C. or less, preferably 35° C. or less, preferably undetectable); and/or a glass transition temperature ($T_g$) of −20° C. or less (preferably −30° C. or less, preferably −40° C. or less, preferably −50° C. or less, preferably −60° C. or less); and/or a $M_w$ of 50 to 5,000 kg/mol (preferably 100 to 3,000 kg/mol, preferably 150 to 2,000 kg/mol, preferably 200 to 1,000 kg/mol); and/or a $M_w/M_n$ of 1.5 to 40 (preferably 1.6 to 30, preferably 1.7 to 20, preferably 1.8 to 10); and/or a Mooney viscosity, ML(1+4) at 125° C. of 1 to 100 (preferably 5 to 95, preferably 10 to 90, preferably 15 to 85, preferably 20 to 80).

In one or more embodiments, the ethylene-propylene elastomers can be functionalized. For example, the ethylene-propylene elastomers can be functionalized by reacting with organic compounds with polar moieties, such as amine-, carboxy-, and/or epoxy-moieties. Examples include maleated EP and EPDM elastomers.

The ethylene-propylene elastomers can be made by any suitable process, including slurry, solution, gas-phase, and high-pressure processes, using a catalyst system appropriate for the polymerization of polyolefins, such as vanadium, Ziegler-Natta, and metallocene catalyst systems, or combinations thereof. In one or more embodiments, synthesis involves a vanadium-based catalyst system in a solution or slurry process. In one or more embodiments, one or more elastomers in the rubber component are produced using a single-site catalyst system, such as a metallocene catalyst, in a solution, slurry, or gas-phase process, and have a $M_w/M_n$ of 1.5 to 2.5. Suitable ethylene-propylene elastomers include those available from ExxonMobil Chemical under the Vistalon®, Vistamaxx™, and Exxelor™ tradenames.

In one or more embodiments, the rubber component is a blend of two or more EP elastomers. In other embodiments, the rubber component is a blend of one or more EP elastomers and one or more EPDM elastomers. In other embodiments, the rubber component is a blend of two or more EPDM elastomers. In further embodiments, the rubber component is a blend of functionalized and unfunctionalized elastomers.

Non-Functionalized Plasticizer (NFP) Component

The elastomer compositions can include at least one non-functionalized plasticizer ("NFP"). The classes of materials described herein that are useful as NFPs can be utilized alone or admixed with other NFPs described to obtain desired properties.

A NFP is a hydrocarbon liquid, that is a liquid compound comprising carbon and hydrogen, which does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent", it is meant that these groups and compounds comprising these groups are not deliberately added to the NFP, and if present at all, are present at less than 5 wt % by weight of the NFP (preferably less than 3 wt %, more preferably less than 1 wt %, more preferably less than 0.5 wt %, more preferably less than 0.3 wt %, more preferably less than 0.1 wt %, more preferably less than 0.05 wt %, more preferably less than 0.01 wt %, based upon the weight of the NFP.

In one or more embodiments, aromatic moieties (including any compound whose molecules have the ring structure characteristic of benzene, naphthalene, etc.) are substantially absent from the NFP. In one or more embodiments, naphthenic moieties (including any compound whose molecules have a saturated ring structure such as would be produced by hydrogenating benzene, naphthalene, etc.) are substantially absent from the NFP. By "substantially absent", it is meant that these compounds are not added deliberately to the compositions and, if present at all, are present at less than 0.5 wt %, preferably less than 0.1 wt %.

In one or more embodiments, the NFP is a hydrocarbon that does not contain olefinic unsaturation to an appreciable extent. By "appreciable extent of olefinic unsaturation" it is meant that the carbons involved in olefinic bonds account for less than 10% (preferably less than 5%, more preferably less than 3%, more preferably less than 1%, more preferably less than 0.5%, more preferably less than 0.3%, more preferably less than 0.1%, more preferably less than 0.05%, more preferably less than 0.01%) of the total number of carbons.

In one or more embodiments, the NFP comprises $C_{20}$ to $C_{1500}$ paraffins, preferably $C_{25}$ to $C_{500}$ paraffins, preferably $C_{25}$ to $C_{500}$ paraffins, preferably $C_{30}$ to $C_{500}$ paraffins, preferably $C_{40}$ to $C_{500}$ paraffins, preferably $C_{40}$ to $C_{250}$ paraffins. Particularly preferred NFPs include oligomers of $C_5$ to $C_{24}$ alpha-olefins (PAOs), Group III basestocks, and high purity hydrocarbon fluids derived from so-called Gas-To-Liquids processes.

Polyalphaolefins

In one or more embodiments, the NFP comprises a polyalphaolefin (PAO) liquid with a pour point of $-10°$ C. or less and a kinematic viscosity at 100° C. (KV100° C.) of 3 cSt or more. PAO liquids are described in, for example, U.S. Pat. Nos. 3,149,178; 4,827,064; 4,827,073; 5,171,908; and 5,783,531 and in Synthetic Lubricants and High-Performance Functional Fluids (Leslie R. Rudnick & Ronald L. Shubkin, ed. Marcel Dekker, Inc. 1999), p. 3-52.

PAOs are high purity hydrocarbons, with a fully paraffinic structure and a high degree of branching. PAO liquids can be conveniently prepared by the oligomerization of an alpha-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts).

In one or more embodiments, the PAO comprises $C_{15}$ to $C_{1500}$ (preferably $C_{20}$ to $C_{1000}$, preferably $C_{30}$ to $C_{800}$, preferably $C_{35}$ to $C_{400}$, most preferably $C_{40}$ to $C_{250}$) oligomers (such as dimers, trimers, etc) of $C_3$ to $C_{24}$ (preferably $C_5$ to $C_{18}$, preferably $C_6$ to $C_{14}$, preferably $C_8$ to $C_{12}$) alpha-olefins, preferably linear alpha-olefins (LAOs), provided that $C_3$ and $C_4$ alpha-olefins are present at 30 wt % or less (preferably 20 wt % or less, preferably 10 wt % or less, preferably 5 wt % or less). Suitable LAOs include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof.

In one or more embodiments, a single LAO is used to prepare the oligomers. A preferred embodiment involves the oligomerization of 1-octene or 1-decene, preferably 1-decene.

In one or more embodiments, the PAO comprises oligomers of two or more $C_3$ to $C_{18}$ LAOs, to make 'bipolymer' or 'terpolymer' or higher-order copolymer combinations, provided that $C_3$ and $C_4$ LAOs are present 30 wt % or less (preferably 20 wt % or less, preferably 10 wt % or less, preferably 5 wt % or less). A preferred embodiment involves oligomerization of a mixture of LAOs selected from $C_6$ to $C_{18}$ LAOs with even carbon numbers. Another preferred embodiment involves oligomerization of 1-octene, 1-decene, and 1-dodecene.

In one or more embodiments, the PAO comprises oligomers of a single alpha-olefin species having a carbon number of 5 to 24 (preferably 6 to 18, more preferably 8 to 12, most preferably 10). In one or more embodiments, the NFP comprises oligomers of mixed alpha-olefins (i.e., two or more alpha-olefin species), each alpha-olefin having a carbon number of 5 to 24 (preferably 6 to 18, preferably 8 to 12). In one or more embodiments, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

In one or more embodiments, the PAO comprises oligomers of one or more alpha-olefin with repeat unit formulas of —[CHR—$CH_2$]— where R is a $C_3$ to $C_{18}$ saturated hydrocarbon branch. In one or more embodiments, R is constant for all oligomers. In one or more embodiments, there is a range of R substituents covering carbon numbers from 3 to 18. Preferably, R is linear, i.e., R is $(CH_2)nCH_3$, where n is 3 to 17, preferably 4 to 11, and preferably 5 to 9. Optionally, R can contain one methyl or ethyl branch, i.e., R is $(CH_2)m[CH(CH_3)](CH_2)zCH_3$ or R is $(CH_2)x[CH(CH_2CH_3)](CH_2)y CH_3$, where (m+z) is 1 to 15, preferably 1 to 9, preferably 3 to 7, and (x+y) is 1 to 14, preferably 1 to 8, preferably 2 to 6. Preferably m>z; more preferably m is 0 to 15, more preferably 2 to 15, more preferably 3 to 12, more preferably 4 to 9; and n is 0 to 10, preferably 1 to 8, preferably 1 to 6, preferably 1 to 4. Preferably x>y; more preferably x is 0 to 14, more preferably 1 to 14, more preferably 2 to 11, more preferably 3 to 8; and y is 0 to 10, preferably 1 to 8, preferably 1 to 6, preferably 1 to 4. Preferably, the repeat units are arranged in a head-to-tail fashion with minimal head-to-head connections.

The PAO can be atactic, isotactic, or syndiotactic. In one or more embodiments, the PAO has essentially the same population of meso and racemic dyads, on average, making it atactic. In one or more embodiments, the PAO has more than 50% (preferably more than 60%, preferably more than 70%, preferably more than 80%, preferably more than 90%) meso dyads (i.e., [m]) as measured by $^{13}$C-NMR. In one or more embodiments, the PAO has more than 50% (preferably more than 60%, preferably more than 70%, preferably more than 80%, preferably more than 90%) racemic dyads (i.e., [r]) as measured by $^{13}$C-NMR. In one or more embodiments, [m]/[r] determined by $^{13}$C-NMR is between 0.9 and 1.1 In one or more embodiments, [m]/[r] is greater than 1 In one or more embodiments, and [m]/[r] is less than 1 in yet another embodiment.

The PAO liquid can include one or more distinct PAO components. In one or more embodiments, the NFP is a blend of one or more PAOs with different compositions (e.g., different alpha-olefin(s) were used to make the oligomers) and/or different physical properties (e.g., kinematic viscosity, pour point, and/or viscosity index).

In one or more embodiments, the PAO or blend of PAOs has a number-average molecular weight ($M_n$) of from 400 to 15,000 g/mol (preferably 400 to 12,000 g/mol, preferably 500 to 10,000 g/mol, preferably 600 to 8,000 g/mol, preferably 800 to 6,000 g/mol, preferably 1,000 to 5,000 g/mol). In one or more embodiments, the PAO or blend of PAOs has a $M_n$ greater than 1,000 g/mol (preferably greater than 1,500 g/mol, preferably greater than 2,000 g/mol, preferably greater than 2,500 g/mol).

In one or more embodiments, the PAO or blend of PAOs has a KV100° C. of 3 cSt or more (preferably 4 cSt or more, preferably 5 cSt or more, preferably 6 cSt or more, preferably 8 cSt or more, preferably 10 cSt or more, preferably 20 cSt or more, preferably 30 cSt or more, preferably 40 cSt or more, preferably 100 or more, preferably 150 cSt or more). In one or more embodiments, the PAO has a KV100° C. of 3 to 3,000 cSt (preferably 4 to 1,000 cSt, preferably 6 to 300 cSt, preferably 8 to 150 cSt, preferably 8 to 100 cSt, preferably 8 to 40 cSt). In one or more embodiments, the PAO or blend of PAOs has a KV100° C. of 10 to 1000 cSt (preferably 10 to 300 cSt, preferably 10 to 100 cSt). In yet another embodiment, the PAO or blend of PAOs has a KV100° C. of 4 to 8 cSt. In yet another embodiment, the PAO or blend of PAOs has a KV100° C. of 25 to 300 cSt (preferably 40 to 300 cSt, preferably 40 to 150 cSt). In one or more embodiments, the PAO or blend of PAOs has a KV100° C. of 100 to 300 cSt.

In one or more embodiments, the PAO or blend of PAOs has a Viscosity Index (VI) of 120 or more (preferably 130 or more, preferably 140 or more, preferably 150 or more, preferably 170 or more, preferably 190 or more, preferably 200 or more, preferably 250 or more, preferably 300 or more). In one or more embodiments, the PAO or blend of PAOs has a VI of 120 to 350 (preferably 130 to 250).

In one or more embodiments, the PAO or blend of PAOs has a pour point of −10° C. or less (preferably −20° C. or less, preferably −25° C. or less, preferably −30° C. or less, preferably −35° C. or less, preferably −40° C. or less, preferably −50° C. or less). In one or more embodiments, the PAO or blend of PAOs has a pour point of −15 to −70° C. (preferably −25 to −60° C.).

In one or more embodiments, the PAO or blend of PAOs has a glass transition temperature ($T_g$) of −40° C. or less (preferably −50° C. or less, preferably −60° C. or less, preferably −70° C. or less, preferably −80° C. or less). In one or more embodiments, the PAO or blend of PAOs has a $T_g$ of −50 to −120° C. (preferably −60 to −100° C., preferably −70 to −90° C.).

In one or more embodiments, the PAO or blend of PAOs has a flash point of 200° C. or more (preferably 210° C. or more, preferably 220° C. or more, preferably 230° C. or more), preferably between 240° C. and 290° C.

In one or more embodiments, the PAO or blend of PAOs has a specific gravity (15.6° C.) of 0.86 or less (preferably 0.855 or less, preferably 0.85 or less, preferably 0.84 or less).

In one or more embodiments, the PAO or blend of PAOs has a molecular weight distribution ($M_w/M_n$) of 2 or more (preferably 2.5 or more, preferably 3 or more, preferably 4 or more, preferably 5 or more, preferably 6 or more, preferably 8 or more, preferably 10 or more). In one or more embodiments, the PAO or blend of PAOs has a $M_w/M_n$ of 5 or less (preferably 4 or less, preferably 3 or less) and a KV110° C. of 10 cSt or more (preferably 20 cSt or more, preferably 40 cSt or more, preferably 60 cSt or more).

In one or more embodiments, the PAO or blend of PAOs has a Noack volatility of less than N* where N*=60e$^{-0.4(KV100°}$ $^{C.)}$ with N* in units of % and KV100° C. of the fluid in question in units of cSt. In an additional embodiment, KV100° C. of the fluid in question is less than 1000 cSt, preferably less than 300 cSt, preferably less than 150 cSt, preferably less than 100 cSt, preferably less than 40 cSt, preferably less than 25 cSt, preferably less than 10 cSt, preferably less than 8 cSt.

In one or more embodiments, the PAO or blend of PAOs has a solubility parameter at 25° C. of 8 or more (preferably 8 to 10) cal$^{1/2}$ cm$^{3/2}$.

Particularly preferred PAOs and blends of PAOs are those having A) a flash point of 200° C. or more (preferably 210° C. or more, preferably 220° C. or more, preferably 230° C. or more); and B) a pour point less than −20° C. (preferably less than −25° C., preferably less than −30° C., preferably less than −35°, preferably less than −40° C.) and/or a KV100° C. of 10 cSt or more (preferably 35 cSt or more, preferably 40 cSt or more, preferably 60 cSt or more).

Further preferred PAOs or blends of PAOs have a KV100° C. of at least 3 cSt (preferably at least 4 cSt, preferably at least 6 cSt, preferably at least 8 cSt, preferably at least 10 cSt); a VI of at least 120 (preferably at least 130, preferably at least 140, preferably at least 150); a pour point of −10° C. or less (preferably −20° C. or less, preferably −30° C. or less, preferably −40° C. or less); and a specific gravity (15.6° C.) of 0.86 or less (preferably 0.855 or less, preferably 0.85 or less, preferably 0.84 or less).

Preferred blends of PAOs include blends of two or more PAOs where the ratio of the highest KV100° C. to the lowest KV100° C. is at least 1.5 (preferably at least 2, preferably at least 3, preferably at least 5). Also preferred are blends of two or more PAOs wherein at least one PAO has a Noack volatility of less than N* as defined above; preferably all the PAOs in a blend have a Noack volatility of less than N*. In an additional embodiment, KV100° C. of the PAOs are less than 1000 cSt, preferably less than 300 cSt, preferably less than 150 cSt, preferably less than 100 cSt, preferably less than 40 cSt, preferably less than 25 cSt, preferably less than 10 cSt, preferably less than 8 cSt.

Preferred blends of PAO also include: blends of two or more PAOs where at least one PAO has a KV100° C. of 300 cSt or more and at least one PAO has a KV100° C. of less than 300 cSt (preferably 150 cSt or less, preferably 100 cSt or less, preferably 40 cSt or less); blends of two or more PAOs where at least one PAO has a KV100° C. of 150 cSt or more and at least one PAO has a KV100° C. of less than 150 cSt (preferably 100 cSt or less, preferably 40 cSt or less); blends of two or more PAOs where at least one PAO has a KV100° C. of 100 cSt or more and at least one PAO has a KV100° C. of less than 100 cSt (preferably 40 cSt or less, preferably 25 cSt or less, preferably 10 cSt or less); blends of two or more PAOs where at least one PAO has a KV100° C. of 40 cSt or more and at least one PAO has a KV100° C. of less than 40 cSt (preferably 25 cSt or less, preferably 10 cSt or less, preferably 8 cSt or less); blends of two or more PAOs where at least one PAO has a KV100° C. of 10 cSt or more and at least one PAO has a KV100° C. of less than 10 cSt (preferably 8 cSt or less, preferably 6 cSt or less, preferably 4 cSt or less); blends of two or more PAOs where at least one PAO has a KV100° C. of 8 cSt or more and at least one PAO has a KV100° C. of less than 8 cSt (preferably 6 cSt or less, preferably 4 cSt or less); and blends of two or more PAOs where at least one PAO has a KV100° C. of 6 cSt or more and at least one PAO has a KV100° C. of less than 6 cSt (preferably 4 cSt or less).

Desirable PAOs are commercially available as SpectraSyn™ and SpectraSyn Ultra™ from ExxonMobil Chemical (USA), some of which are summarized in Table A. Other useful PAOs include those available as Synfluid™ from ChevronPhillips Chemical (USA), as Durasyn™ from Innovene (USA), as Nexbase™ from Neste Oil (Finland), and as Synton™ from Chemtura (USA). For PAOs, the percentage of carbons in chain-type paraffinic structures ($C_P$) is close to 100% (typically greater than 98% or even 99%).

higher, preferably 99 wt % or higher; and/or the percentage of carbons in chain-type paraffinic structures ($C_P$) of 80% or more, preferably 90% or more, preferably 95% or more, preferably 98% or more; and/or a branched paraffin:normal paraffin ratio greater than about 10:1, preferably greater than 20:1, preferably greater than 50:1, preferably greater than 100:1, preferably greater than 500:1, preferably greater than 1000:1; and/or sidechains with 4 or more carbons making up less than 10% of all sidechains, preferably less than 5%, preferably less than 1%; and/or sidechains with 1 or 2 carbons making up at least 50% of all sidechains, preferably at least 60%, preferably at least 70%, preferably at least 80%, preferably at least 90%, preferably at least 95%, preferably at

TABLE A

SpectraSyn ™ Series Polyalphaolefins

| | KV40° C., cSt | KV100° C., cSt | $M_n$, g/mol | $M_w/M_n$ | VI | Pour Point, ° C. | Specific gravity | Flash Point, ° C. | Noack, % | S.P., $cal^{1/2}cm^{3/2}$ |
|---|---|---|---|---|---|---|---|---|---|---|
| SpectraSyn 4 | 19 | 4 | 450 | <1.1 | 126 | −66 | 0.820 | 220 | 14 | 8.09 |
| SpectraSyn Plus 4 | 17 | 4 | 440 | <1.1 | 126 | −60 | 0.820 | 228 | 12 | 8.12 |
| SpectraSyn 6 | 31 | 6 | 540 | <1.1 | 138 | −57 | 0.827 | 246 | 6.4 | 8.14 |
| SpectraSyn Plus 6 | 30 | 6 | 560 | <1.1 | 143 | −54 | 0.827 | 246 | 5.0 | 8.15 |
| SpectraSyn 8 | 48 | 8 | 640 | <1.1 | 139 | −48 | 0.833 | 260 | 4.1 | 8.15 |
| SpectraSyn 10 | 66 | 10 | 720 | <1.1 | 137 | −48 | 0.835 | 266 | 3.2 | 8.17 |
| SpectraSyn 40 | 396 | 39 | 1,700 | ~1.5 | 147 | −36 | 0.850 | 281 | 1.6 | 8.30 |
| SpectraSyn 100 | 1240 | 100 | 2,800 | ~2.5 | 170 | −30 | 0.853 | 283 | 1.1 | 8.33 |
| SpectraSyn Ultra 150 | 1,500 | 150 | 3,700 | ~2.5 | 218 | −33 | 0.850 | >265 | 0.4 | 8.38 |
| SpectraSyn Ultra 300 | 3,100 | 300 | 4,900 | ~2.5 | 241 | −27 | 0.852 | >265 | 0.3 | 8.38 |
| SpectraSyn Ultra 1000 | 10,000 | 1,000 | 11,000 | ~2.5 | 307 | −18 | 0.855 | >265 | 0.3 | 8.38 |

KV40° C. = kinematic viscosity at 40° C.
KV100° C. = kinematic viscosity at 100°C.
S.P. = solubility parameter.

High Purity Hydrocarbon Fluids

In one or more embodiments, the nonfunctionalized plasticizer (NFP) is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures. Preferably, the mixture of paraffins comprises a wax isomerate lubricant base stock or oil, which includes: (A) hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of about 20 or more; and (B) hydroisomerized synthetic waxes, such as Fischer-Tropsch waxes (i.e., the high boiling point residues of Fischer-Tropsch synthesis, including waxy hydrocarbons); or mixtures thereof. Most preferred are lubricant base stocks or oils derived from hydrocarbons synthesized in a Fischer-Tropsch process as part of an overall Gas-to-Liquids (GTL) process.

In one or more embodiments, the mixture of paraffins has a naphthenic content of less than 40 wt %, preferably less than 30 wt %, preferably less than 20 wt %, preferably less than 15 wt %, preferably less than 10 wt %, preferably less than 5 wt %, preferably less than 2 wt %, preferably less than 1 wt % (based on the total weight of the hydrocarbon mixture); and/or a normal paraffins content of less than 5 wt %, preferably less than 4 wt %, preferably less than 3 wt %, preferably less than 1 wt % (based on the total weight of the hydrocarbon mixture); and/or an aromatic content of 1 wt % or less, preferably 0.5 wt % or less; and/or a saturates level of 90 wt % or higher, preferably 95 wt % or higher, preferably 98 wt % or least 98%; and/or a sulfur content of 300 ppm or less, preferably 100 ppm or less, preferably 50 ppm or less, preferably 10 ppm or less (where ppm is on a weight basis); and/or a nitrogen content of 300 ppm or less, preferably 100 ppm or less, preferably 50 ppm or less, preferably 10 ppm or less (where ppm is on a weight basis); and/or a number-average molecular weight of 300 to 1800 g/mol, preferably 400 to 1500 g/mol, preferably 500 to 1200 g/mol, preferably 600 to 900 g/mol; and/or a kinematic viscosity at 40° C. of 10 cSt or more, preferably 25 cSt or more, preferably between about 50 and 400 cSt; and/or a kinematic viscosity at 100° C. ranging from 2 to 50 cSt, preferably 3 to 30 cSt, preferably 5 to 25 cSt, preferably 6 to 20 cSt, more preferably 8 to 16 cSt; and/or a viscosity index (VI) of 80 or greater, preferably 100 or greater, preferably 120 or greater, preferably 130 or greater, preferably 140 or greater, preferably 150 or greater, preferably 160 or greater, preferably 180 or greater; and/or a pour point of −5° C. or lower, preferably −10° C. or lower, preferably −15° C. or lower, preferably −20° C. or lower, preferably −25° C. or lower, preferably −30° C. or lower; and/or a flash point of 200° C. or more, preferably 220° C. or more, preferably 240° C. or more, preferably 260° C. or more; and/or a specific gravity (15.6° C./15.6° C.) of 0.86 or less, preferably 0.85 or less, preferably 0.84 or less; and/or an aniline point of 120° C. or more.

In one or more embodiments, the mixture of paraffins comprises a GTL base stock or oil. GTL base stocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is "syngas" (synthesis gas, essentially CO and H2) derived from a suitable source, such as natural gas and/or coal. GTL base stocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL base stocks and oils can further comprise other hydroisomerized base stocks and base oils. Particularly preferred GTL base stocks or oils are those comprising mostly hydroisomerized F-T waxes and/or other liquid hydrocarbons obtained by a F-T synthesis process.

The synthesis of hydrocarbons, including waxy hydrocarbons, by F-T can involve any suitable process known in the art, including those involving a slurry, a fixed-bed, or a fluidized-bed of catalyst particles in a hydrocarbon liquid. The catalyst can be an amorphous catalyst, for example based on a Group VIII metal such as Fe, Ni, Co, Ru, and Re on a suitable inorganic support material, or a crystalline catalyst, for example a zeolitic catalyst. The process of making a lubricant base stock or oil from a waxy stock is characterized as a hydrodewaxing process. A hydrotreating step, while typically not required for F-T waxes, can be performed prior to hydrodewaxing if desired. Some F-T waxes can benefit from removal of oxygenates while others can benefit from oxygenates treatment prior to hydrodewaxing. The hydrodewaxing process is typically conducted over a catalyst or combination of catalysts at high temperatures and pressures in the presence of hydrogen. The catalyst can be an amorphous catalyst, for example based on Co, Mo, W, etc. on a suitable oxide support material, or a crystalline catalyst, for example a zeolitic catalyst such as ZSM-23 and ZSM-48 and others disclosed in U.S. Pat. No. 4,906,350, often used in conjunction with a Group VIII metal such as Pd or Pt. This process can be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluidized-bed, or slurry type process at high temperatures and pressures in the presence of hydrogen.

Useful catalysts, processes, and compositions for GTL base stocks and oils, Fischer-Tropsch hydrocarbon derived base stocks and oils, and wax isomerate hydroisomerized base stocks and oils are described in, for example, U.S. Pat. Nos. 2,817,693; 4,542,122; 5,545,674; 4,568,663; 4,621,072; 4,663,305; 4,897,178; 4,900,407; 4,921,594; 4,923,588; 4,937,399; 4,975,177; 5,059,299; 5,158,671; 5,182,248; 5,200,382; 5,290,426; 5,516,740; 5,580,442; 5,885,438; 5,935,416; 5,935,417; 5,965,475; 5,976,351; 5,977,425; 6,025,305; 6,080,301; 6,090,989; 6,096,940; 6,103,099; 6,165,949; 6,190,532; 6,332,974; 6,375,830; 6,383,366; 6,475,960; 6,620,312; and 6,676,827; European Patents 324528, 532116, 532118, 537815, 583836, 666894, 668342, 776959; WPO patent applications 97/31693, 99/20720, 99/45085, 02/64710, 02/64711, 02/70627, 02/70629, and 03/33320; and British Patents 1,350,257; 1,390,359; 1,429,494; and 1,440,230. Particularly favorable processes are described in European Patent Applications 464546 and 464547. Processes using Fischer-Tropsch wax feeds are described in U.S. Pat. Nos. 4,594,172; 4,943,672; 6,046,940; 6,103,099; 6,332,974; 6,375,830; and 6,475,960.

Desirable GTL-derived fluids are expected to become broadly available from several commercial sources, including Chevron (USA), ConocoPhillips (USA), ExxonMobil (USA), Sasol (South Africa), Shell (UK), Statoil (Russia), and Syntroleum (USA).

The GTL-derived fluid can include one or more distinct GTL-derived fluid components. For example, the NFP can be a blend of one or more GTL-derived fluids with different physical properties (e.g., kinematic viscosity, pour point, viscosity index, and/or glass transition temperature).

In one or more embodiments, the GTL-derived fluid or blend of GTL-derived fluids have a KV100° C. of at least 4 cSt (preferably at least 6 cSt, preferably at least 8 cSt, preferably at least 10 cSt, preferably at least 12 cSt); a VI of at least 120 (preferably at least 130, preferably at least 140, preferably at least 150); a pour point of −10° C. or less (preferably −15° C. or less, preferably −20° C. or less, preferably −25° C. or less); and a specific gravity (15.6° C.) of 0.85 or less (preferably 0.84 or less, preferably 0.83 or less).

In one or more embodiments, the NFP is a blend of at least one GTL-derived fluid and one or more PAOs. Preferably, the KV100° C. of the GTL-derived fluid or blend of GTL-derived fluids is at least 1.2 (preferably 1.5, preferably 2.0, preferably 2.5, preferably 3.0) times the KV100° C. of the PAO or blend of PAOs; or the KV100° C. of the PAO or blend of PAOs is at least 1.2 (preferably 1.5, preferably 2.0, preferably 2.5, preferably 3.0) times the KV100° C. of the GTL-derived fluid or blend of GTL-derived fluids. Particularly preferred are blends of a PAO having a KV100° C. of 25 cSt or more (preferably 40 cSt or more, preferably 100 cSt or more) and a GTL-derived fluid having a KV100° C. of less than 25 cSt (preferably 15 cSt or less, preferably 10 cSt or less).

In one or more embodiments, the crosslinked elastomer composition can include one or more EP and/or EPDM elastomers and one or more NFP where at least one NFP is a high purity hydrocarbon fluid derived from a GTL process comprising a mixture of paraffins of carbon number ranging from about $C_{20}$ to $C_{100}$, a molar ratio of isoparaffins:n-paraffins greater than about 50:1, the percentage of carbons in paraffinic structures ($C_P$) of 98% or more, a pour point ranging from about −20 to −60° C., and a kinematic viscosity at 100° C. ranging from about 6 to 20 cSt.

As used herein, the following terms have the indicated meanings: "naphthenic" describes cyclic (mono-ring and/or multi-ring) saturated hydrocarbons (i.e., cycloparaffins) and branched cyclic saturated hydrocarbons; "aromatic" describes cyclic (mono-ring and/or multi-ring) unsaturated hydrocarbons and branched cyclic unsaturated hydrocarbons; "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and can be further hydrotreated to remove heteroatoms.

Group III Mineral Oils

In one or more embodiments, the NFP comprises a Group III Mineral Oil (i.e., a mineral oil with VI of 120 or more). Preferably the Group III Mineral Oil has a saturates levels of 90% or more (preferably 92% or more, preferably 94% or more, preferably 95% or more, preferably 98% or more); and a sulfur content less than 0.03% (preferably between 0.001 and 0.01%).

The Group III Mineral Oil can include one or more distinct Group III Mineral Oil components. For example, the NFP can be a blend of one or more Group III Mineral Oils with different physical properties (e.g., kinematic viscosity, pour point, viscosity index, and/or glass transition temperature).

In one or more embodiments the Group III Mineral Oil or blend of Group III Mineral Oils have a VI of 130 or more, a KV100° C. of 3 to 50 (preferably 4 to 40 cSt, preferably 6 to 30 cSt, preferably 8 to 20 cSt), and a number average molecular weight of 300 to 5,000 g/mol (preferably 400 to 2,000 g/mol, more preferably 500 to 1,000 g/mol). Preferably the Group III Mineral Oil or blend of Group III mineral oils has a pour point of −10° C. or less, a flash point of 200° C. or more, and a specific gravity (15.6° C.) of 0.86 or less.

In one or more embodiments, the Group III Mineral Oil or blend of Group III Mineral Oils have a VI of 125 or more (preferably 130 or more), a KV100° C. of at least 4 cSt (preferably at least 6 cSt, preferably at least 8 cSt, preferably at least 10 cSt, preferably at least 12 cSt); a pour point of −10° C. or less (preferably −15° C. or less); and a specific gravity (15.6° C.) of 0.85 or less (preferably 0.84 or less).

Preferably the Group III mineral oil is a Group III basestock. Desirable Group III basestocks are commercially available from a number of sources and include those described in Table B. The percentage of carbons in chain-type paraffinic structures ($C_P$) in such liquids is greater than 80%.

TABLE B

Commercially Available Group III Basestocks

|  | KV100° C., cSt | VI | Pour Point, ° C. | Specific gravity | Flash Point, ° C. |
|---|---|---|---|---|---|
| UCBO 4R[1] | 4.1 | 127 | −18 | 0.826 | 216 |
| UCBO 7R[1] | 7.0 | 135 | −18 | 0.839 | 250 |
| Nexbase 3043[2] | 4.3 | 124 | −18 | 0.831 | 224 |
| Nexbase 3050[2] | 5.1 | 126 | −15 | 0.835 | 240 |
| Nexbase 3060[2] | 6.0 | 128 | −15 | 0.838 | 240 |
| Nexbase 3080[2] | 8.0 | 128 | −15 | 0.843 | 260 |
| Yubase YU-4[3] | 4.2 | 122 | −15 | 0.843 | 230 |
| Yubase YU-6[3] | 6.5 | 131 | −15 | 0.842 | 240 |
| Yubase YU-8[3] | 7.6 | 128 | −12 | 0.850 | 260 |
| Ultra-S 4[4] | 4.3 | 123 | −20 | 0.836 | 220 |
| Ultra-S 6[4] | 5.6 | 128 | −20 | 0.839 | 234 |
| Ultra-S 8[4] | 7.2 | 127 | −15 | 0.847 | 256 |
| VHVI 4[5] | 4.6 | 128 | −21 | 0.826 |  |
| VHVI 8[5] | 8.0 | 127 | −12 | 0.850 | 248 |
| Visom 6[6] | 6.6 | 148 | −18 | 0.836 | 250 |

[1] Available from ChevronTexaco (USA).
[2] Available from Neste Oil (Finland).
[3] Available from SK Corp (South Korea).
[4] Available from ConocoPhillips (USA).
[5] Available from PetroCanada (Canada).
[6] Available from ExxonMobil (USA).

In one or more embodiments, the NFP is a blend of at least one Group III Mineral Oil and one or more PAOs. Preferably, the KV100° C. of the Group III Mineral Oil or blend of Group III Mineral Oils is at least 1.2 (preferably 1.5, preferably 2.0, preferably 2.5, preferably 3.0) times the KV100° C. of the PAO or blend of PAOs; or the KV100° C. of the PAO or blend of PAOs is at least 1.2 (preferably 1.5, preferably 2.0, preferably 2.5, preferably 3.0) times the KV100° C. of the Group III Mineral Oil or blend of Group III Mineral Oils. Particularly preferred are blends of a PAO having a KV100° C. of 10 cSt or more (preferably 20 cSt or more, preferably 40 cSt or more) and a Group III Mineral Oil having a KV100° C. of less than 10 cSt (preferably 8 cSt or less, preferably 6 cSt or less).

General Characteristics of Useful NFPs

In one or more embodiments, the NFP has a KV100° C. of 3 cSt or more, preferably 4 cSt or more, preferably 5 cSt or more, preferably 6 to 5000 cSt, preferably 8 to 3000 cSt, preferably 10 to 1000 cSt, preferably 12 to 500 cSt, preferably 15 to 350 cSt, preferably 35 to 300 cSt, preferably 40 to 200 cSt, preferably 50 to 150 cSt, preferably 60 to 100 cSt, wherein a desirable range can be any combination of any lower KV100° C. limit with any upper KV100° C. limit described herein.

In one or more embodiments, the NFP has a pour point of −10° C. or less, preferably −15° C. or less, preferably −20° C. or less, preferably −30° C. or less, preferably −40° C. or less, preferably −45° C. or less, preferably −50° C. or less, preferably greater than −120° C., preferably greater than −100° C., preferably greater than −80° C., wherein a desirable range can be any combination of any lower pour point limit with any upper pour point limit described herein. In one or more embodiments, the NFP has a pour point of less than −30° C. when the kinematic viscosity at 40° C. is from 0.5 to 200 cSt.

In one or more embodiments, the NFP has a glass transition temperature ($T_g$) of −40° C. or less (preferably −50° C. or less, preferably −60° C. or less, preferably −70° C. or less, preferably −80° C. or less, preferably greater than −120° C., preferably greater than −90° C., wherein a desirable range can be any combination of any lower $T_g$ limit with any upper $T_g$ limit described herein.

In one or more embodiments, the NFP has a Viscosity Index (VI) of 90 or more, preferably 100 or more, preferably 110 or more, preferably 115 or more, preferably 120 or more, preferably 130 or more, preferably 135 or more, preferably less than 350, preferably less than 300, preferably less than 250, wherein a desirable range can be any combination of any lower VI limit with any upper VI limit described herein.

In one or more embodiments, the NFP has a flash point of 200° C. or greater, preferably 2100 or greater, preferably 220° C. or greater, preferably 230° C. or greater, preferably less than 350° C., preferably less than 300° C., wherein a desirable range can be any combination of any lower flash point limit with any upper flash point limit described herein.

In one or more embodiments, the NFP has a specific gravity of 0.86 or less, preferably 0.855 or less, preferably 0.85 or less, preferably 0.84 or less, preferably 0.78 or more, preferably 0.79 or more, preferably 0.80 or more, preferably 0.81 or more, preferably 0.82 or more, wherein a desirable range can be any combination of any lower specific gravity limit with any upper specific gravity limit described herein.

In one or more embodiments, the NFP has a number-average molecular weight ($M_n$) of 250 g/mol or more, preferably 300 g/mol or more, preferably 400 g/mol or more, preferably 500 g/mol or more, preferably 20 kg/mol or less, preferably 10 kg/mol or less, preferably 5 kg/mol or less, preferably 3 kg/mol or less, preferably 2 kg/mol or less, preferably 1 kg/mol or less, wherein a desirable range can be any combination of any lower $M_n$ limit with any upper $M_n$ limit described herein.

In one or more embodiments, the NFP has a low degree of color, such as typically identified as "water white", "prime white", "standard white", or "bright and clear," preferably an APHA color of 100 or less, preferably 80 or less, preferably 60 or less, preferably 40 or less, preferably 20 or less.

Any of the NFP's can be described by any embodiment described herein, or any combination of the embodiments described herein. For example, the NFP can include $C_{25}$ to $C_{1500}$ paraffins and have a flash point of 200° C. or more, a pour point of −10° C. or less, and a VI of 120 or more. Alternately the NFP can include $C_{25}$ to $C_{1500}$ paraffins and have a flash point of 200° C. or more and a pour point of −20° C. or less. Alternately the NFP can include $C_{25}$ to $C_{1500}$ paraffins and have a flash point of 200° C. or more and a KV100° C. of 35 cSt or more.

In one or more embodiments the NFP has a KV100° C. of 3 to 3000 cSt (preferably 6 to 300 cSt, more preferably 8 to 100 cSt) and a $M_w$ of 300 to 10,000 g/mol (preferably 500 to 5,000 g/mol, more preferably 600 to 3,000 g/mol).

In one or more embodiments, the NFP has a KV100° C. of 3 cSt or more (preferably 5 cSt or more, preferably 6 cSt or more, preferably 8 cSt or more, preferably 10 cSt or more), a specific gravity (15.6° C.) of 0.86 or less (preferably 0.855 or less, preferably 0.85 cSt or less), and a flash point of 200° C. or more (preferably 220° C. or more, preferably 240° C. or more).

In one or more embodiments, the NFP has a KV100° C. of 4 cSt or more (preferably 5 cSt or more, preferably 6 cSt or more, preferably 8 cSt or more, preferably 10 cSt or more), a pour point of −10° C. or less (preferably −15° C. or less, preferably −20° C. or less, preferably −25° C. or less), a VI of 100 or more (preferably 120 or more, preferably 135 or more), a specific gravity (15.6° C.) of 0.86 or less (preferably 0.855 or less, preferably 0.85 or less), and a flash point of 200° C. or more (preferably 220° C. or more, preferably 240° C. or more).

In one or more embodiments, the NFP has (a) a KV100° C. of 3 cSt or greater (preferably 6 cSt or greater, more preferably 8 cSt or greater) and one or more of the following properties: (b1) a pour point of −10° C. or less (preferably −20° C. or less, preferably −30° C. or less, preferably −40° C. or less); and/or (b2) a VI of 120 or greater (preferably 130 or greater); and/or (b3) an APHA color of 100 or less (preferably 80 or less, preferably 60 or less, preferably 40 or less, preferably 20 or less, preferably 15 or less); and/or (b4) a flash point of 200° C. or more (preferably 220° C. or more, preferably 240° C. or more); and/or (b5) a specific gravity (15.6° C.) of less than 0.86.

In one or more embodiments, the NFP has a KV100° C. of 35 cSt or more (preferably 40 cSt or more, preferably 50 cSt or more, preferably 60 cSt or more) and a specific gravity (15.6° C.) of 0.87 or less (preferably 0.865 or less, preferably 0.86 or less, preferably 0.855 or less) and a flash point of 200° C. or more (preferably 230° C. or more).

In one or more embodiments, the NFP has a KV100° C. of 35 cSt or more (preferably 40 or more), a specific gravity (15.6° C.) of 0.86 or less (preferably 0.855 or less), a flash point of 200° C. or more (preferably 220° C. or more, preferably 240° C. or more), and a pour point of −10° C. or less (preferably −15° C. or less, preferably −20° C. or less, preferably −25° C. or less).

In one or more embodiments, the NFP has a flash point of 200° C. or more (preferably 210° C. or more, preferably 220° C. or more, preferably 230° C. or more) and a pour point of −10° C. or less (preferably −20° C. or less, preferably −25° C. or less, preferably −30° C. or less, preferably −35° C. or less, preferably −45° C. or less, preferably −50° C. or less).

In one or more embodiments, the NFP has a flash point of 200° C. or more (preferably 210° C. or more, preferably 220° C. or more), a pour point of −10° C. or less (preferably −20° C. or less, preferably −30° C. or less), and a KV100° C. of 6 cSt or more (preferably 8 cSt or more, preferably 10 cSt or more, preferably 15 cSt or more).

In one or more embodiments, the NFP has (a) a flash point of 200° C. or more, (b) a specific gravity of 0.86 or less, and one or more of the following properties: (c1) a pour point of −10° C. or less and a viscosity index of 120 or more; and/or (c2) a pour point of −20° C. or less; and/or (c3) a KV100° C. of 35 cSt or more.

In one or more embodiments, the NFP has a specific gravity (15.6° C.) of 0.85 or less, a KV100° C. of 3 cSt or more (preferably 4 or more, preferably 5 cSt or more, preferably 8 cSt or more, preferably 10 cSt or more, preferably 15 cSt or more, preferably 20 cSt or more), and/a $M_n$ of at least 280 g/mol.

In one or more embodiments, the NFP has a specific gravity (15.6° C.) of 0.86 or less (preferably 0.855 or less, preferably 0.85 or less), a KV100° C. of 5 cSt or more (preferably 6 or more, preferably 8 cSt or more, preferably 10 cSt or more, preferably 12 cSt or more, preferably 15 cSt or more), and a $M_n$ of at least 420 g/mol.

In one or more embodiments, the NFP has a specific gravity (15.6° C.) of 0.87 or less (preferably between 0.82 and 0.87) and a KV100° C. of 10 cSt or more (preferably 12 cSt or more, preferably 15 cSt or more, preferably 20 cSt or more, preferably 30 cSt or more, preferably 40 cSt or more) and/or a $M_n$ of at least 700 g/mol.

In one or more embodiments, the NFP has a specific gravity (15.6° C.) of 0.88 or less (preferably 0.87 or less) and a KV100° C. of 15 cSt or more (preferably 20 cSt or more, preferably 25 cSt or more, preferably 30 cSt or more, preferably 40 cSt or more) and/or a $M_n$ of at least 840 g/mol.

In one or more embodiments, the NFP has (a) a specific gravity (15.6° C.) of 0.86 or less (preferably 0.855 or less, preferably 0.85 or less) and one or more of the following: (b1) a VI of 120 or more (preferably 135 or more, preferably 140 or more); and/or (b2) a flash point of 200° C. or more (preferably 220° C. or more, preferably 240° C. or more).

In one or more embodiments, the NFP has (a) a pour point of −10° C. or less (preferably −15° C. or less, preferably −20° C. or less, preferably −25° C. or less) and one or more of the following: (b1) a VI of 120 or more (preferably 135 or more, preferably 140 or more); and/or (b2) a flash point of 200° C. or more (preferably 220° C. or more, preferably 240° C. or more).

In one or more embodiments, the NFP has (a) a pour point of −20° C. or less (preferably −25° C. or less, preferably −30° C. or less, preferably −40° C. or less) and one or more of the following: (b1) a flash point of 200° C. or more (preferably 220° C. or more, preferably 240° C. or more); and/or (b2) a VI of 120 or more (preferably 135 or more, preferably 140 or more); and/or (b3) a KV100° C. of 4 cSt or more (preferably 6 cSt or more, preferably 8 cSt or more, preferably 10 cSt or more); and/or (b4) a specific gravity (15.6° C.) of 0.86 or less (preferably 0.855 or less, preferably 0.85 or less).

In one or more embodiments, the NFP has a pour point of −25° C. or less, a kinematic viscosity at 40° C. of 20 to 5000 cSt, and a $M_n$ of 400 g/mol or greater.

In one or more embodiments, the NFP has a pour point of −40° C. or less (preferably −50° C. or less) and a specific gravity of 0.84 or less (preferably 0.83 or less).

In one or more embodiments, the percentage of carbons in chain-type paraffins ($C_P$) in the NFP is at least 80% (preferably at least 85%, more preferably at least 90%, even more preferably at least 95%, even more preferably at least 98%, most preferably at least 99%).

In one or more embodiments, the compositions can be characterized in that the weight of the composition decreases less than 3% (preferably less than 2%, preferably less than 1%) when permanence of the NFP is determined on an 0.25 mm thick sheet subjected to 300 hours in a dry 70° C. oven.

Weight loss here refers to the reduction in weight in excess of that measured for the unplasticized composition under the same test conditions.

In one or more embodiments, the NFP's can be characterized in that, when blended with the elastomer to form a plasticized composition, there is no change in the number of tan-delta peaks in an Dynamic Mechanical Thermal Analysis (DMTA) trace for the plasticized composition as compared to the DMTA trace for the unplasticized composition (the DMTA trace is the plot of tan-delta vs temperature).

Component Concentrations

In one or more embodiments, the rubber component is present in an amount of from a low of 10 wt % (preferably 15 wt %, preferably 20 wt %, preferably 30 wt %) to a high of 90 wt % (preferably 80 wt %, preferably 70 wt %, preferably 60 wt %) based on total weight of the elastomer composition, wherein a desirable range can be any combination of any lower wt % limit with any upper wt % limit described herein. In one or more embodiments, the composition includes at least one EP or EPDM elastomer in the amount of 20 to 90 wt % (preferably 30 to 75 wt %, preferably 40 to 60 wt %) based on the total weight of the composition.

In one or more embodiments, the NFP is present in an amount of from a low of 10 wt % (preferably 15 wt %, more preferably 20 wt %, even more preferably 25 wt %) to a high of 80 wt % (preferably 70 wt %, more preferably 60 wt %, even more preferably 50 wt %, even more preferably 40 wt %) based on total weight of the composition, wherein a desirable range can be any combination of any lower wt % limit with any upper wt % limit described herein. In one or more embodiments, the composition includes at least one NFP in an amount of about 1 to 60 wt % (preferably 5 to 50 wt %, more preferably 10 to 30 wt %) based on the total weight of the composition. In one or more embodiments, the NFP is present at 50 to 300 parts (preferably 60 to 250 parts, preferably 70 to 200 parts, preferably 80 to 150 parts) per 100 parts rubber component (by weight).

In one or more embodiments, the composition contains essentially no mineral oil with a VI of less than 120 (i.e., paraffinic, naphthenic, and/or aromatic mineral oils). By that, it is meant that no mineral oil is intentionally added to the composition as a processing aid or oil. Accordingly, in one or more embodiments, the compositions comprise less than 10 wt % (preferably less than 5 wt %, preferably less than 2 wt %, preferably less than 1 wt %) of mineral oils based on the total weight of all mineral oils and NFPs present in the composition.

Cure System

Any curative that is capable of curing or crosslinking the rubber component can be used. Illustrative curatives include, but are not limited to, peroxides and other free-radical generating curatives, sulfur and sulfur-containing curatives, phenolic curatives, hydrosilane and alkoxysilane curatives, silicon-containing curatives, and blends thereof. Such curing, or vulcanization, systems for elastomers are well known in the art.

In one or more embodiments, the curing agent is one or more peroxide compound, preferably one or more organic peroxide compound. Peroxide cross-linking is possible without the presence of unsaturated moieties in the polymer backbone but can be accelerated by the presence of such moieties. Useful organic peroxides include but are not limited to: diaryl peroxides, ketone peroxides, peroxydicarbonates, peroxyesters, dialkyl peroxides, hydroperoxides, benzoyl peroxides, lauroyl peroxides, di-t-butyl peroxide, dicumyl peroxide, t-butylcumyl peroxide, t-butyl peroctoate, p-di(t-butylperoxy)diisopropylbenzene, 2,5-dimethyl-2,5-di(t-butylperoxy)hexane, 1,1-di(t-butylperoxy)-3,3,5-trimethylcyclohexane, 2,5-dimethyl-2,5-di(t-butylperoxy)hexene-3, t-butyl-peroxy-(cis-3-carboxy)propenoate, 1,1-di(t-amylperoxy)cyclohexane, t-amyl-(2-ethylhexyl)peroxycarbonate, t-butylperoxy-3,5,5-trimethylhexanoate, t-butyl peroxybenzoate, and mixtures thereof. Peroxides having a 1 minute half-life at temperatures of less than 200° C. (preferably less than 185° C., preferably less than 170° C.) are preferred. Blends of peroxides having different activation temperatures can be utilized to more precisely control the curing process. In one or more embodiments, the composition comprises 0.5 to 20 parts (preferably 1 to 18 parts, preferably 1.5 to 16 parts, preferably 2 to 14 parts) of peroxide per 100 parts rubber component (by weight). Peroxides are available from a variety of commercial suppliers, including Luperox® from Arkema (France), Trigonox® and Perkadox® from Akzo Nobel (Netherlands), and Varox® from R.T. Vanderbilt (USA), either as a liquid product or as a concentrated assay on an inorganic support. Peroxide curing agents are preferred for applications that demand excellent high-temperature performance.

In one or more embodiments, the curing agent is elemental sulfur or a sulfur-containing (sulfur donor) compound such as dithiomorpholine. Typically, sulfur cure systems also involve one or more accelerants and/or coagents. Sulfur curing agents are preferred for applications that demand excellent low-temperature performance.

Phenolic curatives are thermosetting resins, often referred to as phenolic resins. Illustrative phenolic resins are described in U.S. Pat. Nos. 2,972,600; 3,287,440; and 6,433,090. These include resole resins made by condensation of alkyl substituted phenols or unsubstituted phenols with aldehydes in an alkaline medium or by condensation of bi-functional phenoldialcohols. Phenolic resins are ideally used in conjunction with a catalyst system, such as halogen donors and/or a hydrogen halide scavenger (e.g., ZnO).

Silicon-containing curatives are typically silicon hydride compounds, such as methylhydrogen polysiloxanes, methylhydrogen dimethyl-siloxane copolymers, alkyl methyl polysiloxanes, bis(dimethylsilyl)alkanes, and bis(dimethylsilyl)benzene. These compounds are typically used in conjunction with a hydrosilylation catalyst:

Cross-linking can also be enhanced through the use of "coagents" such as organic or metallic acrylates and methacrylates (for example: dimethyl acrylate, triallyl cyanurate, zinc diacrylate, or zinc dimethacrylate), especially in the case of peroxide cured articles.

Other Elastomers

In one or more embodiments, the composition can include one or more other elastomers including natural rubber, polyisoprene, polyisobutylene, polybutadiene, butyl, chlorobutyl, bromobutyl, nitrile, ethylene-vinyl acetate, chlorinated polyethylene, and chloroprene.

Fillers and Additives

In one or more embodiments, the composition can include typical additives per se known in the art such as antioxidants, UV stabilizers, adhesion promoters, block, antiblock, pigments/colorants/dyes, color masterbatches, processing aids (including fatty acids, esters, and paraffin wax), lubricants, neutralizers, metal deactivators, surfactants, nucleating agents, waxes, tackifiers (including aliphatic and alicyclic hydrocarbon resins), calcium stearate, slip agents, dessicants, and flame retardants (including aluminum hydroxide and antimony trioxide). Preferred antioxidants include those commonly used in the elastomer industry, such as quinolines (e.g., trimethylhydroxyquinolein), imidazoles (e.g., zinc mercapto toluyl imidazole), and phenylamines; and conventional antioxidants, such as organic phosphites, hindered amines (including hindered amine light stabilizers), phenolics, and lactones. Examples of organic phosphites that are suitable are tris(2,4-di-tert-butylphenyl)phosphite (IRGAFOS 168) and di(2,4-di-tert-butylphenyl)pentaerythritol diphosphite (ULTRANOX 626). Examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944) and bis(1,2,2,6,6-pentamethyl-4-piperidyl)sebacate (TINUVIN 770). Examples of phenolic antioxidants include substituted phenols such as 2,6-di-t-butylphenol in which a hydrogen atom at 2 and/or 6 position is substituted by an alkyl residue, pentaerythrityl tetrakis(3,5-di-tert-butyl-4-hydroxyphenyl)propionate (IRGANOX 1010); and 1,3,5-tri(3,5-di-tert-butyl-4-hydroxybenzyl-isocyanurate (IRGANOX 3114). The amount of antioxidants used can be within the range of 0.001 to 10 parts per 100 parts rubber component (by weight). Examples of adhesion promoters are polar acids, polyaminoamides, urethanes, coupling agents (such as silane or titanate esters), reactive acrylate monomers, metal acid salts, polyphenylene oxide, oxidized polyolefins, acid modified polyolefins, and anhydride modified polyolefins.

In one or more embodiments, the composition can include one or more fillers. Suitable fillers include reinforcing fillers such as carbon black, talc, carbon fibers, or silica, which can improve the mechanical and wear properties of the compositions, as well as non-reinforcing fillers such as calcium carbonate or titanium dioxide. Other suitable fillers include inorganic particulate fillers, conductive fillers, magnesium carbonate, magnesium dioxide, barium sulfate, silicates, silicon dioxide, graphite, mica, sand, glass beads or fibers, clay, mineral aggregates, wollastonite, and zinc oxide. Inorganic fillers can include particles less than 1 mm in diameter, rods/fibers less than 1 cm in length, and plates less than 0.2 $cm^2$ in surface area. The amount of inorganic filler used can exceed 300 phr; preferably inorganic filler is present at less than 300 phr (preferably less than 200 phr, preferably less than 100 phr) where phr is parts per 100 parts rubber component (by weight). This only includes only the rubber component as defined by the claims and does not include any additional rubber that is added that does not fall within the scope of the rubber component as defined by the claims. In some embodiments, the composition contains no inorganic filler. The filler can also be an organoclay, such as montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and the like, and functionalized derivatives thereof. Filler is preferably present at between 1 and 80 wt % (preferably between 5 and 60 wt %, preferably between 10 and 40 wt %) based on the total weight of the composition. In one or more embodiments, the compound contains no filler.

While certain classes of fillers/additives and preferred amounts of specific fillers/additives have been suggested above, more generally (absent specific directions otherwise given herein) the compositions can optionally have one or more fillers/additives, preferably in the amount of less than 80 wt %, or less than 70 wt %, or less than 60 wt %, or less than 50 wt %, or less than 40 wt %, or less than 30 wt %, or less than 20 wt %, or less than 10 wt %, or in other embodiments less than 5 wt %, or less than 2 wt %, or less than 1 wt %, based upon the total weight of the composition. While not critical to the characterization of a "composition comprising a filler/additive", which means that one or more fillers and/or additives are added, a lower limit can be 100 ppm, 500 ppm, 1000 ppm, or similar amounts. In some embodiments it can be preferable for there to be no fillers/additives, or in other cases preferred embodiments can be directed to the absence of specific fillers/additives, e.g., some preferred embodiments have no carbonates, no inorganic fillers, and so on. Filler/additives in the nature of unavoidable impurities can of course be present in the case where no filler/additives are purposefully added but in some embodiments it can be useful to further purify ingredients to avoid filler/additives as much as possible. One of ordinary skill in the art, in possession of the present disclosure, can determine the nature and amount of these optional ingredients by routine experimentation.

Properties of the Composition

In one or more embodiments, the uncured composition can have a Mooney Viscosity ML(1+4) at 125° C. of from 10 to 100 (preferably from 20 to 80), a green strength as measured by the stress at 10% strain in a tensile test of from 0.5 to 20 MPa (preferably 1 to 15 MPa), and a tensile strain at break of 300% or more (preferably 400% or more, preferably 500% or more).

In one or more embodiments, the cured composition can have a degree of curing such that at least 2 wt % (preferably at least 5 wt %, preferably at least 10 wt %, preferably at least 20 wt %, preferably at least 35 wt %, preferably at least 45 wt %, preferably at least 65 wt %, preferably at least 75 wt %, preferably at least 85 wt %) of the rubber component is insoluble after 24 hours in refluxing xylene, calculated after accounting for any additives, fillers, and NFP.

Blending of the Components

In one or more embodiments, the components can be combined into an intimate mixture using conventional blending equipment and methods used in the elastomer industry. Suitable equipment includes batch mixers, internal mixers (such as Banbury mixers), roll-mills, kneaders, extruders (including combinations of a compounding extruder and a side-arm extruder used directly or indirectly downstream of a polymerization process), static mixers, impingement mixers, and combinations thereof. The components can be first "dry-blended" such as in a tumble-blender and subsequently melt-blended in the blending equipment, or can be combined by direct addition individually into the blending equipment. Addition of one or more components can involve a masterbatch wherein the concentration of the component in a carrier is higher than the concentration of that component in the final composition. The blended composition can be formed into sheet, granules, flakes, bales, pellets, pastilles, and the like. The blending method per se would be well within the skill of the ordinary artisan.

The composition in an appropriate form can then be used in the final process, e.g., extruded into a product, such as a sheet, tube, profile, or other article. The shaped article can then be cured by raising the temperature for a period of time to allow the curing of the elastomer composition. The curing systems can be mixed into the elastomer composition prior to the shaping step of the article to be made.

End-Uses

The elastomer composition can be useful for the fabrication of shaped articles and parts made by using standard elastomer processing techniques like extrusion, calendaring, and molding (e.g., injection or compression molding). Such articles include seals (such as used in building construction or appliances), roofing, tubing, hoses, strips, joints, isolators, wire and cable jackets, medical device components (including syringe parts and catheters), packaging, trays, toys, sporting equipment, furniture, kitchen devices, handles, belts (including power transmission and conveyor belts) and appliance components. Also included are articles for transportation vehicles such as cars, trucks, trains, airplanes, and boats, including weather seals, noise and/or vibration insulation seals and mounts, disks, diaphragms, cups, joints, tubing, hoses, gaskets, o-rings, belts (including synchronous, asynchronous, serpentine, and V belts), wiper blades, mud flaps, skins, mats, boots, bellows, and trim.

In one or more embodiments, the elastomer composition can be at least partially adhered or otherwise at least partially attached to a second component or substrate to form a composite structure. The second component can be, or include, another elastomeric composition according to one or more embodiments described, an unplasticized elastomeric composition, a thermoset rubber, a thermoplastic resin or plastic, a thermoplastic vulcanizate, or a metal. In one or more embodiments, the two or more structures are at least partially adhered or otherwise at least partially attached to one another to form a composite structure. Illustrative composite structures include, but are not limited to, molded corners, molded end caps, glass run channels, trunk seals, tailgate seals, cowl seals, gap fillers, glass encapsulation, cut line seals, door seals, hood-to-radiator seals, roof line seals, rocker panels, sashes, and belt-line seals.

Experimental Methods

For purpose of this invention and the claims herein, unless otherwise noted, physical and chemical properties described are measured using the following test methods.

Elastomer Properties

| | |
|---|---|
| Density | ASTM D 1505 |
| Ethylene content of EP(DM) Polymers | ASTM D 3900 (A) |
| Diene content of EPDM Polymers | ASTM D 6047 |
| Mooney Viscosity (MH, ML, Rh) | ASTM D 1646 |
| Tensile Properties (Modulus, Break) | ASTM D 412 |
| Flexural Modulus, 1% Secant | ASTM D 790 (A) |
| Compression Set | ASTM D 395 (B) |
| Tension Set | ASTM D 412 |
| Hardness (Durometer) | ASTM D 2240 |

Dynamic Mechanical Thermal Analysis (DMTA) provides information on the small-strain mechanical response (relaxation behavior) of a sample as a function of temperature over a temperature range that includes the glass transition region. Appropriate DMTA instrumentation is readily available from several commercial vendors. Samples are tested in a three point bending configuration at a frequency of 1 Hz and amplitude of 20 µm, from −130° C. to 100° C. at 3° C./min. The output is the storage modulus (E') and loss modulus (E") as a function of temperature. Tan-delta is the ratio of E"/E' and gives a measure of the damping characteristics of the material. The glass transition, associated with the so-called beta-relaxation mode, is characterized by the peak temperature (herein identified as $T_g$) and the area under the peak.

Differential Scanning Calorimetry (DSC) is used to measure crystallization temperature ($T_c$) and melting temperature ($T_m$). Appropriate DSC instrumentation is readily available from several commercial vendors. Typically, 2 to 10 mg of a sample is sealed in an aluminum pan and loaded into the DSC at room temperature. Melting data (first heat) is acquired by heating the sample to at least 30° C. above its melting temperature at a heating rate of 10° C./min. The sample is held for at least 5 minutes at this temperature to destroy its thermal history. Crystallization data is acquired by cooling the sample from the melt to at least 50° C. below the crystallization temperature at a cooling rate of 20° C./min. The sample is held at this temperature for 5 minutes, and then heated at 110° C./min to acquire additional melting data (second heat). The endothermic melting transition (first and second heat) and exothermic crystallization transition are analyzed for peak temperatures; $T_m$ is reported as the peak melting temperature from the second heat unless otherwise specified. For polymers displaying multiple peaks, $T_m$ is defined to be the peak melting temperature associated with the largest endothermic response; likewise, $T_c$ is defined to be the peak crystallization temperature associated with the largest exothermic response. The total peak area associated with the second heat endothermic response is the heat of fusion, $H_f$, which is used to calculate the degree of crystallinity (in weight percent) by [$H_f$(in J/g)/H° (in J/g)]*100, where H° is the ideal heat of fusion for the homopolymer of the major monomer component. A value of 300 J/g is used for H° of polyethylene, and 200 J/g is used for H° of polypropylene.

Size-Exclusion Chromatography (SEC) is used to measure the weight-average molecular weight ($M_w$), number-average molecular weight ($M_n$), and molecular weight distribution ($M_w/M_n$ or MWD) of polymers. Appropriate SEC instrumentation is readily available from several commercial vendors. The following experimental conditions are employed: differential refractive index (DRI) detector; column set of 3 Polymer Laboratories PLgel 10 mm Mixed-B columns; flow rate of 0.5 mL/min; injection volume of 300 µL; carrier solvent of 1,2,4-trichlorobenzene (TCB) containing 1.5 g/L of butylated hydroxy toluene. The columns, DRI detector, and transfer lines are contained in a 135° C. oven. The carrier solvent is filtered online through a 0.7 µm glass pre-filter then a 0.1 µm Teflon filter, and degassed with an online degasser. Polymer solutions are prepared by placing dry polymer in a glass container, adding the desired amount of TCB, then heating the mixture at 160° C. with continuous agitation for about 2 hours. All quantities are measured gravimetrically. The TCB densities used to express polymer concentration in mass/volume units are 1.463 g/ml at room temperature and 1.324 g/ml at 135° C. The injection concentration ranges from 1.0 to 2.0 mg/ml, with lower concentrations being used for higher molecular weight samples. Prior to running a set of samples, the DRI detector and the injector are purged, the flow rate increased to 0.5 ml/minute, and the DRI allowed to stabilize for 8-9 hours. The relative concentration of polymer at each point in the chromatogram (i.e., the plot of DRI signal as a function of elution volume) is calculated from the baseline-subtracted DRI signal. The molecular weight associated with a given elution volume is determined by calibrating the column set using known narrow MWD polystyrene standards, run under identical experimental conditions. Commercially available SEC analysis software is used to calculate $M_n$ and $M_w$ from the chromatogram using this "polystyrene" calibration curve. This approach yields the "polystyrene-equivalent" $M_n$ and $M_w$ values, which are used herein.

Polymer microstructure can be determined by $^{13}$C-NMR spectroscopy, including the concentration of isotactic and syndiotactic diads ([m] and [r]), triads ([mm] and [rr]), and pentads ([mmmm] and [rrrr]). Samples are dissolved in d$_2$-1, 1,2,2-tetrachloroethane. Spectra are recorded at 125° C. using a 100 MHz NMR. Polymer resonance peaks are referenced to mmmm=21.8 ppm. Calculations follow the work of F. A. Bovey in "Polymer Conformation and Configuration" (Academic Press, 1969) and J. Randall in "Polymer Sequence Determination, $^{13}$C-NMR Method" (Academic Press, 1977).

The percent of dimer methylene sequences, % $(CH_2)_2$=the integral for methyl carbons between 14-18 ppm divided by the sum of the integral for lone methylene carbons between 45-49 ppm and the integral for methyl carbons between 14-18 ppm, times 100. Assignments were based on H. N. Cheng and J. A. Ewen, Makromol. Chem. 190, p. 1931 (1989).

Fluid Properties

| | |
|---|---|
| Kinematic Viscosity (KV) | ASTM D 445 |
| Viscosity Index (VI) | ASTM D 2270 |
| Pour Point | ASTM D 97 |
| Specific Gravity and Density | ASTM D 4052 (15.6/15.6° C.) |
| Flash Point | ASTM D 92 |
| Noack (evaporative loss) | ASTM D 5800 |
| Glass Transition Temperature ($T_g$) | ASTM 1356 |
| Branch Paraffin: N-paraffin ratio | $^{13}$C-NMR |
| % mono-methyl species | $^{13}$C-NMR |
| % side chains with X number of carbons | $^{13}$C-NMR |
| Saturates Content | ASTM D 2007 |
| Sulfur Content | ASTM D 2622 |
| Nitrogen Content | ASTM D 4629 |
| Aniline Point | ASTM D 611 |

Color can be determined on the APHA scale by ASTM D 1209. Note that an APHA color of 100 corresponds to a Saybolt color (ASTM D 156) of about +10; an APHA color of 20 corresponds to a Saybolt color of about +25; and an APHA color of 0 corresponds to a Saybolt color of about +30.

Carbon type composition can be determined by ASTM D 2140, and gives the percentage of aromatic carbons ($C_A$), naphthenic carbons ($C_N$), and paraffinic carbons ($C_P$) in the fluid. Specifically, $C_A$ is the wt % of total carbon atoms in the fluid that are in aromatic ring-type structures; $C_N$ is the wt % of total carbon atoms in the fluid that are in saturated ring-type structures; and $C_P$ is the wt % of total carbon atoms in the fluid that are in paraffinic chain-type structures. ASTM D 2140 involves calculating a "Viscosity Gravity Constant" (VGC) and "Refractivity Intercept" (RI) for the fluid, and determining the carbon type composition from a correlation based on these two values. However, this method is known to fail for highly paraffinic oils, because the VGC and RI values fall outside the correlation range. Therefore, the following protocol can be used: If the calculated VGC (ASTM D 2140) for a fluid is 0.800 or greater, the carbon type composition including $C_P$ is determined by ASTM D 2140. If the calculated VGC (ASTM D 2140) is less than 0.800, the fluid is considered to have $C_P$ of at least 80%. If the calculated VGC (ASTM D 2140) is less than 0.800 but greater than 0.765, then ASTM D 3238 is used to determine the carbon type composition including $C_P$. If application of ASTM D 3238 yields unphysical quantities (e.g., a negative $C_A$ value), then $C_P$ is defined to be 100%. If the calculated VGC (ASTM D 2140) for a fluid is 0.765 or less, then $C_P$ is defined to be 100%.

The number-average molecular weight ($M_n$) can be determined by one of two methods. For samples having KV100° C. of 10 cSt or less, Gas Chromatography (GC) with a mass spectrometer detector is used. Suitable GC methods are generally described in "Modern Practice of Gas Chromatography", 3$^{rd}$ Ed., R. L. Grob and E. F. Barry (Wiley-Interscience, 1995). For samples having KV100° C. of more than 10 cSt, Gel Permeation Chromatography (GPC) is used and "polystyrene-equivalent" $M_n$ values are reported. Suitable GPC methods involving a DRI detector are generally described in "Modern Size Exclusion Liquid Chromatographs", W. W. Yan, J. J. Kirkland, and D. D. Bly (J. Wiley & Sons, 1979).

Permanence

Permanence of the NFP can be determined following ASTM D 1203, by measuring the weight loss from the plasticized composition in the form of a 0.25 mm thick sheet, after 300 hours in dry 70° C. oven. Permanence is 100% minus the Corrected % weight loss, where Corrected % weight loss=(% weight loss for the plasticized composition)−(% weight loss for the unplasticized composition under the same test conditions), and % weight loss=100×(W−$W_o$)/$W_o$, where W=weight after drying and $W_o$ is the weight before drying. The unplasticized composition is the same composition as the plasticized composition but without NFP added; both are tested in the cured state.

NFP Content

In the absence of knowledge of the specific formulation of the plasticized composition, the NFP content (wt % basis) in the cured composition can be determined by Soxhlet extraction in cyclohexane for 16 hours. Preferably, the base composition (i.e., cured but without NFP) is subjected to the same analysis, since low molecular weight material can be present in both compositions that is soluble in the extraction solvent; the NFP content is then more accurately determined by correcting the extractables level for the plasticized composition by that for the base composition. The presence of NFP in the extract can be verified by traditional gas chromatography methods using mass-spectrometer detection.

EXAMPLES

The foregoing discussion can be further described with reference to the following non-limiting examples. The following examples illustrate the surprising and significant effect from presence of one or more non-functionalized plasticizers in elastomer compositions. Such elastomer compositions exhibited unexpectedly high flexibility after prolonged heat-aging above 100° C. and/or upon cooling below 0° C., and surprisingly high oil retention.

The blend components used to prepare the examples are listed in Tables 1.1 to 1.5 below. Each example was prepared by batch compounding on a 3.2 L Banbury mixer, operated at 50 rpm. The startup temperature was between 48 and 55° C. All components were added and allowed to mix for 30 sec before putting the ram down. The Banbury was swept at 90° C., and dumped after mixing for an additional 3.5 to 4.5 minutes, at which point the temperature had reached between 112 and 150° C. The peroxide cure system was added on a roll mill. Test specimens were compression molded and evaluated using standard testing protocols. Tensile specimens were cured for 20 min at 180° C.

From Ex. 1 and 2, substituting PAO for mineral oil resulted in more efficient plasticization of the compound and a higher cure state despite having a higher viscosity (KV100° C. of 100 vs 31 cSt). Superior plasticization efficiency is judged by a lower compound Mooney viscosity, ML (1+4 @ 100° C.). Superior cure state is judged by changes in properties correlated with crosslink density, such as a higher tensile hardness, higher stress at break, higher strain at break, lower compression set, and higher Mooney MH-ML values. Upon aging, the PAO formulations (Ex. 2-7) retained their tensile properties to a greater extent than the mineral oil formulation (Example 1) and maintained a higher level of elasticity (lower compression set)—both due to superior permanence of the PAO.

High viscosity PAO (KV100° C. of 300 cSt or more) is generally difficult to homogenously blend into the elastomer compound, even at reduced PAO loadings (10 phr vs 50 phr above) and extended mixing times. Surprisingly, however, blending a high viscosity PAO and a low viscosity PAO (KV100° C. of less than 300 cSt, or 100 cSt or less) allows all the PAO to be well incorporated into the compound. Thus, while 10 phr of SpectraSyn 300 could not be homogeneously added to a formulation using the disclosed mixing conditions, a combination of 10 phr SpectraSyn 300 and 40 phr SpectraSyn 100 (50 phr total) was readily incorporated. Similarly, while 10 phr of SpectraSyn 1000 could not be homogeneously added to a formulation using the mixing conditions, a combination of 10 phr SpectraSyn 1000 and 40 phr SpectraSyn 100 was readily incorporated. It is believed that the low viscosity PAO acted as a "carrier" in order to facilitate the mixing and incorporation of the high viscosity PAO.

Ex. 3-6 show the effects of blending a high viscosity PAO (SpectraSyn 300) with a low viscosity PAO (SpectraSyn 100) at various levels (10/90, 20/80, 40/60 and 60/40), as well as results for a 20/80 blend of SpectraSyn 150 with SpectraSyn 100. The data shows the synergistic effect of combining a low viscosity PAO with a high viscosity PAO, resulting in superior plasticization and superior permanence.

Ex. 8-11 compare formulations made with a paraffinic oil (Flexon 815) to those made with a PAO (SpectraSyn 40) of nearly the same KV100° C. Comparing Ex. 8 and 9, the use of the PAO in place of the paraffinic mineral oil resulted in significantly improved high temperature hot air aging resistance and high temperature compression set, which are important performance parameters for rubber parts exposed to a high temperature environment during their service life. The cure state (reflected in Mooney MH-ML) and the cure rate (reflected in Mooney Rh) were also higher for the formulation with PAO compared to the same formulation with mineral oil, due to the lower interaction of PAO with the peroxide curing agent. At the same time, the Mooney viscosity (ML 1+4 @ 100° C.) was lower for the PAO formulation, despite the slightly higher viscosity of SpectraSyn 40 vs Flexon 815 (KV100° C. of 40 vs 32 cSt).

Comparing Examples 10 and 11, the use of the PAO in place of the paraffinic mineral oil resulted in a significant improvement in low temperature flexibility. The cure state (MH-ML) and the cure rate (Rh) were again higher for the PAO based formulation due to the lower interaction of the PAO with the peroxide curing agent. This reflects a higher crosslink density that, in turn, results in higher tensile modulus. This tensile modulus increase is an important improvement for rigid part applications such as wiper blades. Low temperature compression set and tension set were also reduced when PAO is used in place of mineral oil.

In Ex. 12-23, the effect of low viscosity PAO (KV100° C. of 10 cSt or less) or blends of low viscosity PAOs was further examined. The room-temperature modulus and low temperature set properties (compression and tension) are superior for the PAO formulations compared to the same formulation with mineral oil.

In Ex. 18-20, an EPDM formulation containing PAO (SpectraSyn 10, KV100° C. of 10 cSt) is compared to the same formulation containing either a mineral oil with a higher viscosity (Flexon 815, KV100° C. of 32 cSt) or a mineral oil with a similar viscosity (Plastol 537, KV100° C. of 11 cSt). Vulcanization was accomplished by extruding the compound into a flat strip shape and then moving the strip through a hot air tunnel at 220° C. in 10 minutes.

Color stability was tested after exposure to UV-light in a QUV Accelerated Weathering Tester (Q-Lab Corporation, Model QUV/se), using a UVB-313 lamp (wavelength range of 280-360 nm) and an irradiance set point of 0.63. The exposure cycle was: 72 hours of alternating 2 hrs UV exposure @ 40° C./2 hrs condensation exposure @ 40° C., followed by 24 hours of alternating 4 hrs UV exposure @ 60° C./4 hrs condensation exposure @ 50° C. Color was measured using a HunterLab Colorimeter, expressed in terms of the L (white-black), a (red-green), and b (yellow-blue) color parameters. The total color change is characterized by DeltaE (the root-mean square average of the changes in L, a, and b). Surprisingly, the compound containing PAO suffered less discoloration (lower DeltaE) upon UV aging than did the compounds containing paraffinic mineral oil.

TABLE 1.1

| Elastomers | | | | |
|---|---|---|---|---|
| Elastomer | Mooney | wt % ethylene | wt % ENB | Source |
| EP | | | | |
| Vistalon ™ 706 | 42 | 65 | — | ExxonMobil |
| Vistalon ™ 785 | 30 | 49 | — | ExxonMobil |
| EPDM | | | | |
| Vistalon ™ 3666[(1)] | 50 | 64 | 3.9 | ExxonMobil |
| Vistalon ™ 7500 | 91 | 56 | 5.7 | ExxonMobil |
| Vistalon ™ 8700[(2)] | 51 | 63 | 8 | ExxonMobil |
| Vistalon ™ 8800 | 15 | 73 | 10 | ExxonMobil |
| Vistalon ™ 9500 | 72 | 60 | 11 | ExxonMobil |

Mooney = Mooney viscosity measured as ML (1 + 4) at 125° C.
[(1)]Contains 75 phr mineral oil (Sunpar 2280 or equivalent)
[(2)]Contains 15 phr mineral oil (Sunpar 2280 or equivalent)

TABLE 1.2

| NFPs | | | | | | |
|---|---|---|---|---|---|---|
| Identifier | KV100° C., cSt | Pour Point, ° C. | Flash Point, ° C. | Specific gravity | $C_P/C_N$, % | Source |
| Paraffinic Mineral Oils | | | | | | |
| Flexon ™ 815 | 32 | −9 | 310 | 0.895 | 67/28 | Imperial Oil |
| Plastol ™ 537 | 11 | −3 | 240 | 0.880 | 66/29 | ExxonMobil |
| Sunpar ® 2280 | 31 | −9 | 305 | 0.899 | 69/29 | Sunoco |
| PAOs | | | | | | |
| SpectraSyn ™ 4 | 4 | −66 | 220 | 0.820 | 100/0 | ExxonMobil |
| SpectraSyn ™ 6 | 6 | −57 | 246 | 0.827 | 100/0 | ExxonMobil |
| SpectraSyn ™ 10 | 10 | −48 | 266 | 0.835 | 100/0 | ExxonMobil |
| SpectraSyn ™ 40 | 40 | −36 | 281 | 0.850 | 100/0 | ExxonMobil |

TABLE 1.2-continued

| Identifier | NFPs KV100° C., cSt | Pour Point, ° C. | Flash Point, ° C. | Specific gravity | $C_P/C_N$, % | Source |
|---|---|---|---|---|---|---|
| SpectraSyn ™ 100 | 100 | −30 | 283 | 0.853 | 100/0 | ExxonMobil |
| SpectraSyn Ultra ™ 150 | 150 | −33 | >265 | 0.850 | 100/0 | ExxonMobil |
| SpectraSyn Ultra ™ 300 | 300 | −27 | >265 | 0.852 | 100/0 | ExxonMobil |

KV100° C. = kinematic viscosity at 100° C.

TABLE 1.3

Fillers

| Identifier | Description | Source |
|---|---|---|
| Durex ® O | carbon black, "lamp black" type | Degussa |
| Mistron ® Vapor | talc (particle size ~1.7 microns) | Luzenac |
| Mistron ® R10C | Talc | Luzenac |
| CB N-550 | carbon black, FEF (fast extruding furnace) type | Cabot |
| Omya ® BSH | calcium carbonate (ground, surface treated) | Omya |
| Sillitin ® Z 86 | quartz + kaolinite mix | Hoffmann Mineral |
| Spheron ® 5000 | carbon black | Cabot |
| Spheron ® 6000 | carbon black | Cabot |

TABLE 2

Formulations (parts by weight) for Examples 1-7

| | Example | | | | | | |
|---|---|---|---|---|---|---|---|
| | 1 | 2 | 3 | 4 | 5 | 6 | 7 |
| Vistalon 706 | 70 | 70 | 70 | 70 | 70 | 70 | 70 |
| Vistalon 7500 | 30 | 30 | 30 | 30 | 30 | 30 | 30 |
| CB N-550 | 75 | 75 | 75 | 75 | 75 | 75 | 75 |
| Mistron Vapor | 50 | 50 | 50 | 50 | 50 | 50 | 50 |
| Sunpar 2280 | 50 | — | — | — | — | — | — |
| SpectraSyn 100 | — | 50 | 45 | 40 | 30 | 20 | 40 |
| SpectraSyn Ultra 150 | — | — | — | — | — | — | 10 |
| SpectraSyn Ultra 300 | — | — | 5 | 10 | 20 | 30 | — |
| Luperox F40 | 9 | 9 | 9 | 9 | 9 | 9 | 9 |

TABLE 1.4

Cure System Components

| Identifier | Description | CAS # | Source |
|---|---|---|---|
| Bisomer ® TMPTMA | trimethylolpropane trimethacrylate, coagent | 3290-92-4 | Cognis |
| CBS | n-cyclohexyl-2-benzothiazole sulphenamide, accelerator | 95-33-0 | |
| Luperox ® F40 | di(tert-butylperoxyisopropyl)benzene (40% on $CaCO_3$ carrier), organic peroxide | 25155-25-3 | Arkema |
| Perkadox ® 14-40 | di(tert-butylperoxyisopropyl)benzene (40% on solid carrier), organic peroxide | 25155-25-3 | Akzo Nobel |
| Rhenocure ® TP/G | zinc dibutyldithiophosphate (50% on solid carrier), accelerator | | Rhein Chemie |
| Rhenogran ® CaO-80 | calcium oxide (80% in EPDM/EVA binder), activator | | Rhein Chemie |
| Rhenogran ® ZAT-70 | zinc dialkyldithiophosphate (activated, 70% in EPDM/EVA binder), accelerator | | Rhein Chemie |
| Sartomer ® SR-350 | trimethylolpropane trimethacrylate, coagent | 3290-92-4 | Sartomer |
| Silquest A-172 | vinyl tri(2-methoxy-ethoxy)silane, coupling agent | 1067-53-4 | General Electric |
| Sulfur | elemental sulfur, vulcanization agent | 7704-34-9 | |
| TAC | 2,4,6-tris(2-propenyloxy)-1,3,5-triazine (also called triallyl cyanurate), coupling agent | 101-37-1 | |
| ZnO | zinc oxide, activator | 1314-13-2 | |

TABLE 1.5

Other Additives

| Identifier | Description | CAS # | Source |
|---|---|---|---|
| Maglite ® D | magnesium oxide, acid absorber | 1309-48-4 | C.P. Hall |
| Structol ® WB 212 | emulsion of fatty acid esters on inorganic carrier, processing aid | | Schill-Seilacher |
| TMQ | 2,2,4-trimethyl-1,2-hydroquinoline, antioxidant | 101-37-1 | Nocil |
| stearic acid | saturated fatty acid | 57-11-4 | |
| Carbowax ™ 3350 | polyethylene glycol, 3000-3700 g/mol avg, lubricant | 25322-68-3 | Dow Chemical |
| Vanox ® ZMTI | zinc 2-mercaptotolumimidazole, antioxidant | 61617-00-3 | R.T. Vanderbilt |

TABLE 2-continued

Formulations (parts by weight) for Examples 1-7

| | Example | | | | | | |
|---|---|---|---|---|---|---|---|
| | 1 | 2 | 3 | 4 | 5 | 6 | 7 |
| Bisomer TMPTMA | 1 | 1 | 1 | 1 | 1 | 1 | 1 |
| Structol WB 212 | 2 | 2 | 2 | 2 | 2 | 2 | 2 |
| Vanox ZMTI | 2 | 2 | 2 | 2 | 2 | 2 | 2 |
| TMQ | 1 | 1 | 1 | 1 | 1 | 1 | 1 |

TABLE 4-continued

Formulations (parts by weight) for Examples 8-11

| | Example | | | |
|---|---|---|---|---|
| | 8 | 9 | 10 | 11 |
| Sulfur | — | — | 0.1 | 0.1 |
| Maglite D | 5 | 5 | — | — |
| Vanox ZMTI | 2 | 2 | — | — |
| TMQ | 2 | 2 | — | — |

TABLE 3

Properties of Examples 1-7

| | Example | | | | | | |
|---|---|---|---|---|---|---|---|
| | 1* | 2* | 3 | 4 | 5 | 6 | 7 |
| Mooney Viscosity | | | | | | | |
| ML (1 + 4 @ 100° C.) | 60.0 | 56.7 | 53.6 | 51.5 | Rotor Slip | Rotor Slip | 52.0 |
| MH-ML (dNm) | 10.4 | 13.7 | 13.7 | 13.5 | Slip | Slip | 12.8 |
| Hardness | 66 | 68 | 67 | 67 | 68 | 68 | 67 |
| Tensile Stress @ Break (MPa) | | | | | | | |
| Initial value after cure | 11.2 | 12.4 | 12.1 | 11.5 | 10.9 | 7.0 | 11.9 |
| Tensile Stress @ Break (MPa) after aging | | | | | | | |
| 125° C. for 168 hours | 11.0 | 12.5 | 12.8 | 11.9 | 10.4 | 6.9 | 12.3 |
| 150° C. for 168 hours | 10.7 | 12.3 | 12.1 | 11.8 | 9.8 | 6.1 | 11.6 |
| 175° C. for 168 hours | 4.5 | 6.0 | 6.0 | 6.1 | 2.8 | 3.5 | 7.2 |
| 150° C. for 1000 hours | 4.3 | 7.0 | 7.3 | 10.0 | | | 8.5 |
| Tensile Strain @ Break (%) | | | | | | | |
| Initial value after cure | 485 | 335 | 340 | 325 | 270 | 210 | 330 |
| Tensile Strain @ Break (%) after aging | | | | | | | |
| 125° C. for 168 hours | 475 | 335 | 340 | 330 | 290 | 205 | 340 |
| 150° C. for 168 hours | 470 | 345 | 340 | 325 | 270 | 185 | 320 |
| 175° C. for 168 hours | 155 | 180 | 190 | 190 | 90 | 100 | 215 |
| 150° C. for 1000 hours | 100 | 180 | 185 | 250 | | | 215 |
| Compression Set (%) after aging | | | | | | | |
| 70° C. for 168 hours | 26 | 18 | 17.5 | 18.3 | | | 17.4 |
| 125° C. for 22 hours | 18 | 11 | 13.2 | 15.2 | | | 14.8 |
| 125° C. for 168 hours | 29 | 23 | 25.5 | 25.3 | | | 24.5 |

*Average of three separate batches

TABLE 4

Formulations (parts by weight) for Examples 8-11

| | Example | | | |
|---|---|---|---|---|
| | 8 | 9 | 10 | 11 |
| Vistalon 706 | 70 | 70 | — | — |
| Vistalon 7500 | 30 | 30 | — | — |
| Vistalon 8800 | — | — | 57.5 | 57.5 |
| Vistalon 785 | — | — | 50 | 50 |
| Mistron R10C | 60 | 60 | — | — |
| Spheron 6000 | 60 | 60 | — | — |
| CB N-550 | — | — | 70 | 70 |
| Sillitin Z 86 | — | — | 60 | 60 |
| Flexon 815 | 50 | — | 47.5 | — |
| SpectraSyn 40 | — | 50 | — | 47.5 |
| Perkadox 14-40 | 9 | 9 | 10 | 10 |
| Sartomer SR-350 | 1 | 1 | — | — |
| Rhenogran CaO-80 | — | — | 5 | 5 |
| TAC | — | — | 3 | 3 |
| Silquest A-172 | — | — | 1 | 1 |

TABLE 5

Properties for Examples 8-9

| | Example | |
|---|---|---|
| | 8 | 9 |
| Mooney Viscosity | | |
| ML(1 + 4) @ 100° C. | 51.5 | 46.7 |
| MH-ML (dNm) | 9.0 | 12.0 |
| Rh (dNm/min) | 6.9 | 8.9 |
| Initial (autoclave cured, 20 min @ 180° C.) | | |
| Hardness (Shore A) | 59 | 59 |
| Tensile strength @ Break (MPa) | 7 | 8 |
| Tensile elongation @ Break (%) | 685 | 500 |
| Compression set (%) after aging in hot air @ 150° C. | | |
| 24 hr, 25% compression | 42 | 37 |
| 70 hr, 25% compression | 46 | 38 |
| 1000 hr, 25% compression | 95 | 81 |

TABLE 5-continued

Properties for Examples 8-9

| | Example 8 | Example 9 |
|---|---|---|
| After aging in hot air for 6 weeks @ 150° C. | | |
| Tensile strength @ Break (MPa) | 5.6 | 6.1 |
| Tensile elongation @ Break (%) | 165 | 230 |
| After aging in hot air for 72 hours @ 175° C. | | |
| Tensile elongation @ Break (%) | 410 | 340 |
| After aging in an oil bath (5W30) for 168 h @ 150° C. | | |
| Hardness (Shore A) | 21 | 33 |

TABLE 6

Properties of Examples 10-11

| | Example 10 | Example 11 |
|---|---|---|
| Mooney Viscosity | | |
| MH-ML (dNm) | 15.5 | 19.7 |
| Rh (dNm/min) | 7.0 | 8.0 |
| Tensile Modulus (MPa) | | |
| 50% strain | 1.4 | 2.1 |
| 100% strain | 3.3 | 6.4 |
| Compression Set (%) | | |
| −20° C. | 25 | 13 |
| −30° C. | 43 | 21 |
| −40° C. | 70 | 34 |
| Tension Set (%) | | |
| −20° C. | 38 | 20 |

TABLE 7

Formulations (parts by weight) for Examples 12-23

| | 12 | 13 | 14 | 15 | 16 | 17 | 18 | 19 | 20 | 21 | 22 | 23 |
|---|---|---|---|---|---|---|---|---|---|---|---|---|
| Vistalon 2502 | 50 | 50 | 50 | — | — | — | — | — | — | — | — | — |
| Vistalon 7602 | 50 | 50 | 50 | — | — | — | — | — | — | — | — | — |
| Vistalon 8800 | — | — | — | 57.5 | 57.5 | 57.5 | 57.5 | 57.5 | 57.5 | 57.5 | 57.5 | 57.5 |
| Vistalon 785 | — | — | — | 50 | 50 | 50 | 50 | 50 | 50 | 50 | 50 | 50 |
| N-550 FEF | 70 | 70 | 70 | 70 | 70 | 70 | 70 | 70 | 70 | 70 | 70 | 70 |
| Silitin Z 86 | 60 | 60 | 60 | 60 | 60 | 60 | 60 | 60 | 60 | 60 | 60 | 60 |
| Flexon 815 | 55 | — | — | 47.5 | — | — | — | — | — | — | — | — |
| SpectraSyn 4 | — | 55 | — | — | 5 | 10 | 15 | 20 | — | — | — | — |
| SpectraSyn 6 | — | — | 55 | — | — | — | — | — | 5 | 10 | 15 | 20 |
| SpectraSyn 10 | — | — | — | — | 42.5 | 37.5 | 32.5 | 27.5 | 42.5 | 37.5 | 32.5 | 27.5 |
| Perkadox 14-40 | 10 | 10 | 10 | 10 | 10 | 10 | 10 | 10 | 10 | 10 | 10 | 10 |
| Rhenogran CaO-80 | 5 | 5 | 5 | 5 | 5 | 5 | 5 | 5 | 5 | 5 | 5 | 5 |
| TAC | 3 | 3 | 3 | 3 | 3 | 3 | 3 | 3 | 3 | 3 | 3 | 3 |
| Silquest A-172 | 1 | 1 | 1 | 1 | 1 | 1 | 1 | 1 | 1 | 1 | 1 | 1 |
| Sulfur | 0.1 | 0.1 | 0.1 | 0.1 | 0.1 | 0.1 | 0.1 | 0.1 | 0.1 | 0.1 | 0.1 | 0.1 |

TABLE 8

Properties for Examples 12-23

| | 12 | 13 | 14 | 15 | 16 | 17 | 18 | 19 | 20 | 21 | 22 | 23 |
|---|---|---|---|---|---|---|---|---|---|---|---|---|
| Mooney Viscosity | | | | | | | | | | | | |
| MH-ML (dNm) | 16.6 | 23.2 | 22.2 | 15.6 | 18.1 | 19.2 | 18.4 | 18.4 | 18.5 | 19.2 | 19.3 | 18.6 |
| Rh (dNm/min) | 8.3 | 10.5 | 10.4 | 7.0 | 8.0 | 8.7 | 8.6 | 7.8 | 8.4 | 8.2 | 8.5 | 8.3 |
| Tensile Modulus (MPa) | | | | | | | | | | | | |
| 50% strain | 1.4 | 2.1 | 2.1 | 1.5 | 1.8 | 2.0 | 1.8 | 1.9 | 1.8 | 1.9 | 1.9 | 1.9 |
| 100% strain | 3.2 | 5.8 | 5.7 | 3.8 | 5.4 | 5.9 | 5.4 | 6.0 | 5.4 | 5.9 | 6.0 | 5.6 |
| Set at −20° C. (%) | | | | | | | | | | | | |
| Compression set | 43 | 13 | 13 | 33 | 15 | 14 | 14 | 14 | 20 | 15 | 15 | 16 |
| Tension set | 40 | 14 | 34 | 20 | 10 | 6 | 6 | 2 | 8 | 13 | 11 | 2 |

TABLE 9

Formulations (parts by weight) for Examples 24-26

| | Example | | |
|---|---|---|---|
| | 24 | 25 | 26 |
| Vistalon 9500 | 92 | 92 | 92 |
| Vistalon 3666 | 15 | 15 | 15 |
| Spheron 5000 | 88 | 88 | 88 |
| Durex O | 60 | 60 | 60 |
| Omya BSH | 40 | 40 | 40 |
| Flexon 815 | 57 | — | — |
| Plastol 537 | — | 57 | — |
| SpectraSyn 10 | — | — | 57 |
| Rhenogran CaO-80 | 6 | 6 | 6 |
| ZnO | 3 | 3 | 3 |
| Rhenocure TP/G | 2.5 | 2.5 | 2.5 |
| CBS | 1.2 | 1.2 | 1.2 |
| Rhenocure ZAT-70 | 1 | 1 | 1 |
| Sulfur | 0.95 | 0.95 | 0.95 |
| Carbowax 3350 | 3 | 3 | 3 |
| Stearic Acid | 0.5 | 0.5 | 0.5 |

TABLE 10

Results for Examples 24-26

| | Example | | |
|---|---|---|---|
| | 24 | 25 | 26 |
| Color, initial | | | |
| L | 17.32 | 17.99 | 17.72 |
| a | −0.17 | −0.27 | −0.32 |
| b | −1.24 | −1.36 | −1.59 |
| Color after QUV aging | | | |
| L | 19.94 | 20.61 | 18.71 |
| a | 0.1 | 0.19 | 0.25 |
| b | −0.19 | 0.34 | 0.28 |
| Color Change | | | |
| DeltaE | 2.8 | 3.2 | 2.2 |

Specific embodiments can further include:

1. An elastomeric composition comprising:
    a rubber component comprising one or more ethylene-propylene elastomers;
    one or more peroxide curing agents; and
    one or more non-functionalized plasticizers having a viscosity index of 120 or more, a kinematic viscosity @100° C. of 20 cSt or more, and a Mn of 1100 g/mole or more.
2. The composition of paragraph 1, wherein the rubber component is a blend of ethylene-propylene (EP) elastomer and ethylene-propylene-diene (EPDM) elastomer.
3. The composition of paragraphs 1 or 2, wherein the one or more ethylene-propylene elastomers is a blend of about 20, 30, or 40 wt % to about 50, 60, or 70 wt % of ethylene-propylene (EP) elastomer and about 50, 60, or 70 wt % to about 20, 30, or 40 wt % ethylene-propylene-diene (EPDM) elastomer, based on total weight of rubber.
4. The composition of any of paragraphs 1 to 3, wherein the one or more ethylene-propylene elastomers is a blend of about 30, 40, 45, or 50 wt % to about 70, 60, 55, or 50 wt % ethylene-propylene (EP) elastomer and about 30, 40, 45, or 50 wt % to about 70, 60, 55 or 50 wt % ethylene-propylene-diene (EPDM) elastomer, based on total weight of rubber.
5. The composition of any of paragraphs 1 to 4, wherein the rubber component is at least partially cured by the peroxide.
6. The composition of any of paragraphs 1 to 5, wherein the one or more non-functionalized plasticizers is present in an amount of about 20 to 50 phr.
7. The composition of any of paragraphs 1 to 6, wherein the one or more non-functionalized plasticizers is a blend of at least two non-functionalized plasticizers.
8. The composition of any of paragraphs 1 to 7, wherein the one or more non-functionalized plasticizers is a blend of at least two non-functionalized plasticizers, wherein two of the plasticizers have a difference in kinematic viscosity @100° C. of about 100 cSt or more.
9. The composition of any of paragraphs 1 to 8, wherein the one or more non-functionalized plasticizers is a blend of at least two non-functionalized plasticizers, wherein two of the plasticizers have a difference in kinematic viscosity @100° C. of about 300 cSt or less.
10. The composition of any of paragraphs 1 to 9, wherein the one or more non-functionalized plasticizers comprises at least two non-functionalized plasticizers where a first non-functionalized plasticizer has a viscosity index of 300 or more and a second non-functionalized plasticizer has a viscosity index of 150 or less.
11. The composition of any of paragraphs 1 to 10, wherein the one or more non-functionalized plasticizers has a kinematic viscosity @100° C. of 40 cSt or more.
12. The composition of any of paragraphs 1 to 11, wherein the one or more non-functionalized plasticizers comprises a blend of at least two plasticizers selected from the group consisting of oligomers of $C_5$ to $C_{24}$ alpha-olefins (PAOs), Group III mineral oils, and wax isomerate lubricant base stocks or oils.
13. The composition of any of paragraphs 1 to 12, wherein at least one of the one or more non-functionalized plasticizers has a Noack volatility of less than N* where $N^* = 60e^{-0.4(KV100° C.)}$ wherein N* has units of % and KV100° C. has units of cSt.
14. An elastomeric composition comprising:
    a rubber component comprising one or more ethylene-propylene elastomers;
    one or more peroxide curing agents; and
    one or more non-functionalized plasticizers having a viscosity index of 120 or more wherein the one or more non-functionalized plasticizers are selected from the group consisting of Group III mineral oils and wax isomerate lubricant base stocks or oils.
15. The composition of paragraph 14, wherein the rubber component is a blend of ethylene-propylene (EP) elastomer and ethylene-propylene-diene (EPDM) elastomer.
16. The composition of paragraphs 14 or 15, wherein the one or more ethylene-propylene elastomers is a blend of about 30 wt % to about 70 wt % of ethylene-propylene (EP) elastomer and about 70 wt % to about 30 wt % ethylene-propylene-diene (EPDM) elastomer.
17. The composition of any of paragraphs 14 to 16, wherein the one or more ethylene-propylene elastomers is a blend of about 45 wt % to about 65 wt % ethylene-propylene (EP) elastomer and about 45 wt % to about 55 wt % ethylene-propylene-diene (EPDM) elastomer.
18. The composition of any of paragraphs 14 to 17, wherein the rubber component is at least partially cured by the peroxide.
19. The composition of any of paragraphs 14 to 18, wherein the one or more non-functionalized plasticizers is present in an amount of about 20 to 50 phr.

20. The composition of any of paragraphs 14 to 19, wherein the one or more non-functionalized plasticizers is a blend of at least two non-functionalized plasticizers.

21. The composition of any of paragraphs 14 to 20, wherein the one or more non-functionalized plasticizers is a blend of at least two non-functionalized plasticizers, wherein two of the plasticizers have a difference in kinematic viscosity @100° C. of about 100 cSt or more.

22. The composition of any of paragraphs 14 to 21, wherein the one or more non-functionalized plasticizers is a blend of at least two non-functionalized plasticizers, wherein two of the plasticizers have a difference in kinematic viscosity @100° C. of about 300 cSt or less.

23. The composition of any of paragraphs 14 to 22, wherein the one or more non-functionalized plasticizers comprises at least two non-functionalized plasticizers where a first non-functionalized plasticizer has a viscosity index of 300 or more and a second non-functionalized plasticizer has a viscosity index of 150 or less.

24. The composition of any of paragraphs 14 to 23, wherein the one or more non-functionalized plasticizers has a kinematic viscosity @100° C. of 40 cSt or more.

25. The composition of any of paragraphs 14 to 24, wherein the one or more non-functionalized plasticizers comprises a blend of at least two plasticizers selected from the group consisting of oligomers of $C_5$ to $C_{24}$ alpha-olefins (PAOs), Group III mineral oils, and wax isomerate lubricant base stock or oil.

26. The composition of any of paragraphs 14 to 25, wherein at least one of the one or more non-functionalized plasticizers has a Noack volatility of less than N* where $N^*=60e^{0.4(KV100°C.)}$ wherein N* has units of % and KV100° C. has units of cSt.

27. An elastomeric composition comprising:
at least one rubber component comprising ethylene-propylene rubber;
at least one rubber component comprising ethylene-propylene-diene (EPDM) rubber; and
two or more non-functionalized plasticizers where at least a first non-functionalized plasticizer has a kinematic viscosity @100° C. of 300 cSt or more and at least a second non-functionalized plasticizer has a kinematic viscosity @100° C. of 150 cSt or less.

28. The composition of paragraph 27, wherein the ethylene-propylene (EP) rubber and ethylene-propylene-diene (EPDM) rubber are at least partially peroxide cured.

29. The composition of paragraphs 27 or 28, wherein a ratio of the first non-functionalized plasticizer to the second non-functionalized plasticizer based on total weight of the plasticizer is about 10:90 to about 40:60.

30. The composition of any of paragraphs 27 to 29, wherein the two or more non-functionalized plasticizers comprises between about 10 wt % and 90 wt % of the first non-functionalized plasticizer.

31. The composition of any of paragraphs 27 to 30, wherein the two or more non-functionalized plasticizers comprises between about 30 wt % and 70 wt % of the first non-functionalized plasticizer.

32. The composition of any of paragraphs 27 to 31, wherein the two or more non-functionalized plasticizers comprises between about 40 wt % and 60 wt % of the first non-functionalized plasticizer.

33. The composition of any of paragraphs 27 to 32, wherein at least one of the two or more non-functionalized plasticizers has a Noack volatility of less than N* where $N^*=60e^{0.4(KV100°C.)}$ wherein N* has units of % and KV100° C. has units of cSt.

34. The composition of any of paragraphs 27 to 33, wherein all of the two or more non-functionalized plasticizers have a Noack volatility of less than N*.

35. An elastomeric composition comprising:
a rubber component comprising one or more ethylene-propylene elastomers;
one or more peroxide curing agents; and
one or more non-functionalized plasticizers having a viscosity index of 120, wherein polypropylene and polyethylene are both substantially absent from the composition.

36. A method for preparing an elastomer composition, comprising:
mixing at least one a rubber component comprising a blend of ethylene-propylene (EP) rubber and ethylene-propylene-diene (EPDM) rubber; peroxide; and one or more non-functionalized plasticizers having a viscosity index of 120 or more, a kinematic viscosity @100° C. of 20 cSt or more, and an Mn of 1100 g/mole or more.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. An elastomeric composition comprising:
a rubber component comprising one or more ethylene-propylene elastomers having a melting point temperature of 70° C. or less;
one or more peroxide curing agents; and
a blend of plasticizers comprising two or more oligomers of $C_5$ to $C_{24}$ alpha-olefins (PAOs), where the ratio of the highest kinematic viscosity at 100° C. to the lowest kinematic viscosity at 100° C. is at least 1.5, and said blend has a viscosity index of 120 or more, a kinematic viscosity at 100° C. of 20 cSt or more, and a $M_n$ of 1100 g/mole or more, wherein polypropylene and polyethylene are both substantially absent from the composition.

2. The composition of claim 1, wherein the rubber component is a blend of ethylene-propylene (EP) elastomer and ethylene-propylene-diene (EPDM) elastomer.

3. The composition of claim 1, wherein the one or more ethylene-propylene elastomers is a blend of about 30 wt % to about 70 wt % of ethylene-propylene (EP) elastomer and about 70 wt % to about 30 wt % ethylene-propylene-diene (EPDM) elastomer.

4. The composition of claim 1, wherein the one or more ethylene-propylene elastomers is a blend of about 45 wt % to about 55 wt % ethylene-propylene (EP) elastomer and about 45 wt % to about 55 wt % ethylene-propylene-diene (EPDM) elastomer.

5. The composition of claim 1, wherein the rubber component is at least partially cured by the peroxide.

6. The composition of claim 1, wherein the blend of plasticizers is present in an amount of about 20 to 50 phr.

7. The composition of claim 1, wherein the blend of plasticizers has a kinematic viscosity at 100° C. of 40 cSt or more.

8. The composition of claim 1, wherein at least one of the plasticizers of the blend of plasticizers has a Noack volatility of less than N* where N*=60e$^{-0.4(KV100C)}$ wherein N* has units of % and KV100° C. has units of cSt.

9. The composition of claim 1, wherein the ethylene-propylene elastomers have a density of 0.885 g/cm$^3$ or less.

10. The composition of claim 1, wherein the ethylene-propylene elastomers have a heat of fusion of 70 J/g or less.

11. The composition of claim 1, wherein the ethylene-propylene elastomers have a ethylene or propylene crystallinity of 15 wt% or less.

12. The composition of claim 1, wherein the ethylene-propylene elastomers have a glass transition temperature of −20° C. or less.

13. The composition of claim 1, wherein the ethylene-propylene elastomers have a Mooney viscosity at 125° C. in the range of 1 to 100.

14. The composition of claim 1, wherein the ethylene-propylene elastomers have a total ethylene content in the range of 50-70 wt%.

15. An elastomeric composition comprising:
a rubber component comprising one or more ethylene-propylene elastomers having a melting point temperature of 70° C. or less;
one or more peroxide curing agents; and a blend of at least two non-functionalized plasticizers, wherein two of the plasticizers have a difference in kinematic viscosity at 100° C. of about 100 cSt or more, and wherein the blend has a viscosity index of 120 or more, a kinematic viscosity at 100° C. of 20 cSt or more, and $M_n$ of 1100 g/mole or more, wherein polypropylene and polyethylene are both substantially absent from the composition.

16. The composition of claim 15, wherein the two plasticizers have a difference in kinematic viscosity at 100° C. of 100 to 300 cSt.

17. An elastomeric composition comprising:
a rubber component comprising one or more ethylene-propylene elastomers having a melting point temperature of 70° C. or less;
one or more peroxide curing agents; and a blend of at least two non-functionalized plasticizers where a first non-functionalized plasticizer has a viscosity index of 300 or more and a second non-functionalized plasticizer has a viscosity index of 150 or less, and wherein the blend has a viscosity index of 120 or more, a kinematic viscosity at 100° C. of 20 cSt or more, and a $M_n$ 1100 g/mole or more, wherein polypropylene and polyethylene are both substantially absent from the composition.

18. An elastomeric composition comprising:
a rubber component comprising one or more ethylene-propylene elastomers having a melting point temperature of 70° C. or less;
one or more peroxide curing agents; and
a blend of at least two non-functionalized plasticizers selected from the group consisting of oligomers of $C_5$ to $C_{24}$ alpha-olefins (PAOs) and wax isomerate lubricant base stocks or oils, where the blend has a viscosity index of 120 or more and where the two non-functionalized plasticizers have different kinematic viscosities, pour points, viscosity indexes or glass transition temperature temperatures, and, wherein polypropylene and polyethylene are both substantially absent from the composition, and wherein the rubber component is at least partially cured by the peroxide.

19. The composition of claim 18, wherein the rubber component is a blend of ethylene-propylene (EP) elastomer and ethylene-propylene-diene (EPDM) elastomer.

20. The composition of claim 18, wherein the one or more ethylene-propylene elastomers is a blend of about 30 w% to about 70 w% of ethylene-propylene (EP) elastomer and about 70 w% to about 30 w% ethylene-propylene-diene(EPDM) elastomer.

21. The composition of claim 18, wherein the one or more ethylene-propylene elastomers is a blend of about 45 wt% to about 55 wt% ethylene-propylene (EP) elastomer and about 45 wt% to about 55 wt% ethylene-propylene-diene (EPDM) elastomer.

22. The composition of claim 18, wherein the blend is present in an amount of about 20 to 50 phr.

23. The composition of claim 18, wherein at least one of the plasticizers of the blend has a Noack volatility of less than N* where N*=60e$^{-0.4(KV100°\ C.)}$ wherein N* has units of % and KV100° C. has units of cSt.

24. An elastomeric composition comprising:
a rubber component comprising one or more ethylene-propylene elastomers having a melting point temperature of 70° C. or less;
one or more peroxide curing agents; and
a blend of at least two non-functionalized plasticizers wherein the non-functionalized plasticizers are selected from the group consisting of Group III mineral oils and wax isomerate lubricant base stocks or oils, wherein the blend has a viscosity index of 120 or more and two of the plasticizers have a difference in kinematic viscosity at 100° C. of about 100 cSt or more, and wherein polypropylene and polyethylene are both substantially absent from the composition.

25. The composition of claim 24, wherein the the two plasticizers have a difference in kinematic viscosity at 100° C. of 100 to 300 cSt.

26. An elastomeric composition comprising:
a rubber component comprising one or more ethylene-propylene elastomers having a melting point temperature of 70° C. or less;
one or more peroxide curing agents; and
a blend comprising at least two non-functionalized plasticizers where a first non-functionalized plasticizer has a viscosity index of 300 or more and a second non-functionalized plasticizer has a viscosity index of 150 or less, and wherein the blend has a viscosity index of 120 or more wherein the one or more non-functionalized plasticizers are selected from the group consisting of Group III mineral oils and wax isomerate lubricant base stocks or oils, wherein polypropylene and polyethylene are both substantially absent from the composition.

27. An elastomeric composition comprising:
at least one rubber component comprising ethylene-propylene rubber;
at least one rubber component comprising ethylene-propylene-diene (EPDM) rubber; and
two or more non-functionalized plasticizers where at least a first non-functionalized plasticizer has a kinematic viscosity at 100° C. of 300 cSt or more and at least a second non-functionalized plasticizer has a kinematic viscosity at 100° C. of 150 cSt or less, wherein polypropylene and polyethylene are both substantially absent from the composition.

28. The composition of claim 27, wherein the ethylene-propylene (EP) rubber and ethylene-propylene-diene (EPDM) rubber are at least partially peroxide cured.

29. The composition of claim 27, wherein a ratio of the first non-functionalized plasticizer to the second non-functionalized plasticizer based on total weight of the plasticizer is about 10:90 to about 40:60.

30. The composition of claim 27, wherein the two or more non-functionalized plasticizers comprises between about 10 wt% and 90 wt% of the first non-functionalized plasticizer.

31. The composition of claim 27, wherein the two or more non-functionalized plasticizers comprises between about 30 wt% and 70 wt% of the first non-functionalized plasticizer.

32. The composition of claim 27, wherein the two or more non-functionalized plasticizers comprises between about 40 wt% and 60 wt% of the first non-functionalized plasticizer.

33. The composition of claim 27, wherein at least one of the two or more non-functionalized plasticizers has a Noack volatility of less than N* where $N^* = 60e^{-0.4(KV100°C.)}$ wherein N* has units of % and KV100° C. has units of cSt.

34. The composition of claim 27, wherein all of the two or more non-functionalized plasticizers have a Noack volatility of less than N*, where $N^* = 60e^{-0.4(KV100°C.)}$ wherein N* has units of % and KV100° C. has units of cSt.

35. An elastomeric composition comprising:
a rubber component comprising one or more ethylene-propylene elastomers;
one or more peroxide curing agents; and
at least two non-functionalized plasticizers, where the first non-functionalized plasticizer has a viscosity index of 300 or more and the second non-functionalized plasticizer has a viscosity index of 150 or less, and both plasticizers have a pour point of −20° C. or less, a flash point of 200° C. or more and a specific gravity of 0.86 or less, wherein polypropylene and polyethylene are both substantially absent from the composition.

36. A method for preparing an elastomer composition, comprising:
mixing at least one a rubber component comprising a blend of ethylene-propylene (EP) rubber having a melting point temperature of 70° C. or less and ethylene-propylene-diene (EPDM) rubber having a melting point temperature of 70° C. or less, a peroxide, and a blend of two or more oligomers of $C_5$ to $C_{24}$ alpha-olefins (PAOs), where the ratio of the highest kinematic viscosity at 100° C. to the lowest kinematic viscosity at 100° C. is at least 1.5, and wherein the blend of oligomers has a viscosity index of 120 or more, a kinematic viscosity at 100° C. of 20 cSt or more, and a $M_n$ of 1100 g/mole or more, and wherein polypropylene and polyethylene are both substantially absent from the composition.

37. An elastomeric composition comprising:
at least one rubber component comprising ethylene-propylene (EP) rubber and/or ethylene-propylene-diene (EPDM) rubber;
one or more peroxide curing agents, and
a non-functionalized plasticizer comprising a blend of two or more oligomers of $C_5$ to $C_{24}$ alpha-olefins (PAOs), where the ratio of the highest kinematic viscosity at 100° C. to the lowest kinematic viscosity at 100° C. ($KV_{100}$ Ratio) is at least 1.5, and where the blend of the two or more PAOs has a viscosity index of 120 or more, a pour point of −20° C. or less and a flash point of 200° C. or more,
wherein the rubber component is at least partially peroxide cured, and
wherein polypropylene and polyethylene are both substantially absent from the composition.

38. The composition of claim 37 wherein the blend has a specific gravity of 0.86 or less.

39. The composition of claim 37 wherein the $rKV_{100}$ Ratio is at least 2.

40. The composition of claim 37 wherein the $KV_{100}$ Ratio is at least 3.

41. The composition of claim 37 wherein the $KV_{100}$ Ratio is at least 5.

42. The composition of claim 37 wherein the blend comprises at least one PAO having a kinematic viscosity at 100° C. of 150 cSt or more and at least one PAO having a kinematic viscosity at 100° C. of 100 cSt or less.

43. The composition of claim 37 wherein the blend comprises at least one PAO having a kinematic viscosity at 100° C. of 100 cSt or more and at least one PAO having a kinematic viscosity at 100° C. of 40 cSt or less.

44. The composition of claim 37 wherein the blend comprises at least one PAO having a kinematic viscosity at 100° C. of 40 cSt or more and at least one PAO having a kinematic viscosity at 100° C. of 25 cSt or less.

45. The composition of claim 37 wherein the blend comprises at least one PAO having a kinematic viscosity at 100° C. of 10 cSt or more and at least one PAO having a kinematic viscosity at 100° C. of 6 cSt or less.

46. The composition of claim 37 wherein the blend comprises at least one PAO having a kinematic viscosity at 100° C. of 10 cSt or more and at least one PAO having a kinematic viscosity at 100° C. of 4 cSt or less.

47. The composition of claim 37, wherein the rubber component is a blend of EP rubber and EPDM rubber.

48. The composition of claim 37, wherein the ratio of the first PAO to the second PAO based on total weight of the plasticizer blend is about 10:90 to about 40:60.

49. The composition of claim 37, wherein a the rubber component comprises a blend of about 30 wt% to about 70 wt% of EP elastomer and about 70 wt% to about 30 wt% EPDM elastomer.

50. The composition of claim 37, wherein the blend of plasticizers is present in an amount of about 20 to 50 phr.

51. The composition of claim 37, wherein the first or second PAO has a kinematic viscosity at 100° C. of 20 cSt or more and a $M_n$ of 1100 g/mole or more.

52. An elastomeric composition comprising:
at least one rubber component comprising ethylene-propylene (EP) rubber and/or ethylene-propylene-diene (EPDM) rubber;
one or more peroxide curing agents, and
a non-functionalized plasticizer comprising a blend of i) at least one oligomer of $C_5$ to $C_{24}$ alpha-olefins (PAO) and ii) at least one wax isomerate lubricant base stock or oil derived from hydrocarbons synthesized in a Fischer Tropsch process as part of a gas to liquids process (GTL-liquid),
where the ratio of the highest kinematic viscosity at 100° C. of the PAO or the GTL liquid to the lowest kinematic viscosity at 100° C. of the PAO or the GTL liquid ($KV_{100}$ Ratio) is at least 1.2, and where the blend of the PAO and the GTL liquid has a viscosity index of 120 or more, a pour point of −20° C. or less and a flash point of 200° C. or more,
wherein the rubber component is at least partially peroxide cured, and
wherein polypropylene and polyethylene are both substantially absent from the composition.

53. The composition of claim 52 wherein the blend has a specific gravity of 0.86 or less.

54. The composition of claim 52 wherein the $KV_{100}$ Ratio is at least 1.5.

55. The composition of claim 52 wherein the $KV_{100}$ Ratio is at least 2.

56. The composition of claim 52 wherein the $KV_{100}$ Ratio is at least 3.

57. The composition of claim 52 wherein the blend comprises at least one PAO having a kinematic viscosity at 100° C. of 25 cSt or more and at least one GTL liquid having a kinematic viscosity at 100° C. of less than 25 cSt.

58. The composition of claim 52 wherein the blend comprises at least one PAO having a kinematic viscosity at 100° C. of 40 cSt or more and at least one GTL liquid having a kinematic viscosity at 100° C. of less than 25 cSt.

59. The composition of claim 52 wherein the blend comprises at least one PAO having a kinematic viscosity at 100° C. of 100 cSt or more and at least one GTL liquid having a kinematic viscosity at 100° C. of less than 25 cSt.

60. The composition of claim 37 wherein the blend comprises at least one PAO and at least one GTL liquid comprising a mixture of paraffins of carbon number ranging from about $C_{20}$ to $C_{100}$, a molar ratio of isoparaffins:n-paraffins greater than about 50:1, the percentage of carbons in paraffinic structures ($C_p$) of 98% or more, a pour point ranging from about −20 to −60° C., and a kinematic viscosity at 100° C. of from about 6 to 20 cSt.

61. The composition of claim 52, wherein the rubber component is a blend of EP rubber and EPDM rubber.

62. The composition of claim 52, wherein the rubber component comprises a blend of about 30 wt% to about 70 wt % of EP elastomer and about 70 wt % to about 30 wt % EPDM elastomer, and the blend of plasticizers is present in an amount of about 20 to 50 phr.

63. The composition of claim 52, wherein the PAO has a kinematic viscosity at 100° C. of 20 cSt or more and a $M_n$ of 1100 g/mole or more.

64. An elastomeric composition comprising:
at least one rubber component comprising ethylene-propylene (EP) rubber and/or ethylene-propylene-diene (EPDM) rubber;
one or more peroxide curing agents, and
a non-functionalized plasticizer comprising a blend of i) at least one oligomer of $C_5$ to $C_{24}$ alpha-olefins (PAO) and ii) at least one Group III Mineral Oil having an VI of 120 or more, a saturates levels of 90% or more, and a sulfur content less than 0.03%,
where the ratio of the highest kinematic viscosity at 100° C. of the PAO or the Group III Mineral Oil to the lowest kinematic viscosity at 100° C. of the PAO or the Group III Mineral Oil ($KV_{100}$ Ratio) is at least 1.2, and where the blend of the PAO and the Group III Mineral Oil has a viscosity index of 120 or more, a pour point of −20° C. or less and a flash point of 200° C. or more,
wherein the rubber component is at least partially peroxide cured, and
wherein polypropylene and polyethylene are both substantially absent from the composition.

65. The composition of claim 64 wherein the blend has a specific gravity of 0.86 or less.

66. The composition of claim 64 wherein the $KV_{100}$ Ratio is at least 1.5.

67. The composition of claim 64 wherein the $KV_{100}$ Ratio is at least 2.

68. The composition of claim 64 wherein the $KV_{100}$ Ratio is at least 3.

69. The composition of claim 64 wherein the blend comprises at least one PAO having a kinematic viscosity at 100° C. of 10 cSt or more and at least one Group III Mineral Oil having a kinematic viscosity at 100° C. of less than 10 cSt.

70. The composition of claim 64 wherein the blend comprises at least one PAO having a kinematic viscosity at 100° C. of 20 cSt or more and at least one Group III Mineral Oil having a kinematic viscosity at 100° C. of less than 10 cSt.

71. The composition of claim 64 wherein the blend comprises at least one PAO having a kinematic viscosity at 100° C. of 40 cSt or more and at least one Group III Mineral Oil having a kinematic viscosity at 100° C. of 8 or less cSt.

72. The composition of claim 64, wherein the rubber component is a blend of EP rubber and EPDM rubber.

73. The composition of claim 64, wherein the rubber component comprises a blend of about 30 wt % to about 70 wt % of EP elastomer and about 70 wt % to about 30 wt % EPDM elastomer, and the blend of plasticizers is present in an amount of about 20 to 50 phr.

74. The composition of claim 64, wherein the PAO has a kinematic viscosity at 100° C. of 20 cSt or more and a $M_n$ of 1100 g/mole or more.

* * * * *